United States Patent [19]

Hiatt

[11] Patent Number: 5,477,518
[45] Date of Patent: Dec. 19, 1995

[54] DETACHABLE STORAGE ASSEMBLY

[75] Inventor: David M. Hiatt, Ballwin, Mo.

[73] Assignee: Southwestern Bell Technology Resources, Inc., St. Louis, Mo.

[21] Appl. No.: 850,272

[22] Filed: Mar. 12, 1992

[51] Int. Cl.$^6$ .................................................. G11B 17/02
[52] U.S. Cl. ........................ 369/75.1; 369/178; 360/98.01
[58] Field of Search ............................... 369/75.1, 34, 35, 369/36, 197, 198, 212, 178; 360/86, 98.01, 98.02, 98.07; 361/392, 393, 294, 396

[56] References Cited

U.S. PATENT DOCUMENTS

| | | | |
|---|---|---|---|
| 4,401,351 | 8/1983 | Record | 361/393 |
| 4,501,460 | 2/1985 | Sisler | 361/392 |
| 4,558,914 | 12/1985 | Prager et al. | 361/393 |
| 5,235,591 | 8/1993 | Nakamura et al. | 369/199 |

FOREIGN PATENT DOCUMENTS

| | | |
|---|---|---|
| 79103444 | 4/1990 | China. |
| 79105000 | 6/1990 | China. |
| 3224147 | 10/1991 | Japan. |

OTHER PUBLICATIONS

IBM Tech. Disc. Bulletin, vol. 30, No. 1, Jun. 1987 pp. 328–329.
"The Latest Electronic Materials," pp. 94–97 (Chinese Version), 1983, Fu–Han publisher.

*Primary Examiner*—Stuart S. Levy
*Assistant Examiner*—Paul J. Ditmyer
*Attorney, Agent, or Firm*—Sandler, Greenblum & Bernstein

[57] ABSTRACT

An apparatus for storing data is disclosed, which has a storage medium support frame for supporting storage medium carrying members of similar configuration. The size of the storage medium support frame can be changed (i.e., adjusted) to accommodate an arbitrary number of storage medium carrying members. In one embodiment, the storage medium carrying member may be in the form of a rewritable optical disk or another type of optical storage platter. The storage medium support frame comprises a plurality of disk units which may be coupled to each other, each disk unit having a disk support structure for supporting at least one platter. The disk units are provided with mechanisms for detachably connecting, and thereby stacking, a variable number of disk units together to form the storage medium support frame. As the disk units are stacked, i.e., detachably connected, axles of the respective platters are interconnected with each other to form a common axle located at a common axis of the storage medium support frame. In an alternative embodiment, a multi-platter assembly having a plurality of platters and a common axle may be removably mounted to a storage medium support frame. A spring-biased bearing mechanism is provided for holding the common axle so that the center axis of the common axle coincide with the common axis of rotation of the storage medium support frame.

43 Claims, 13 Drawing Sheets

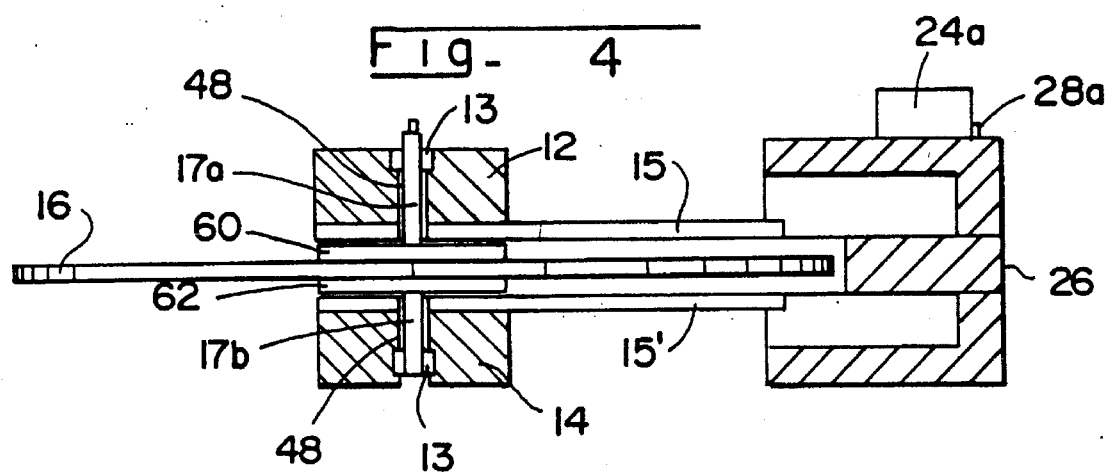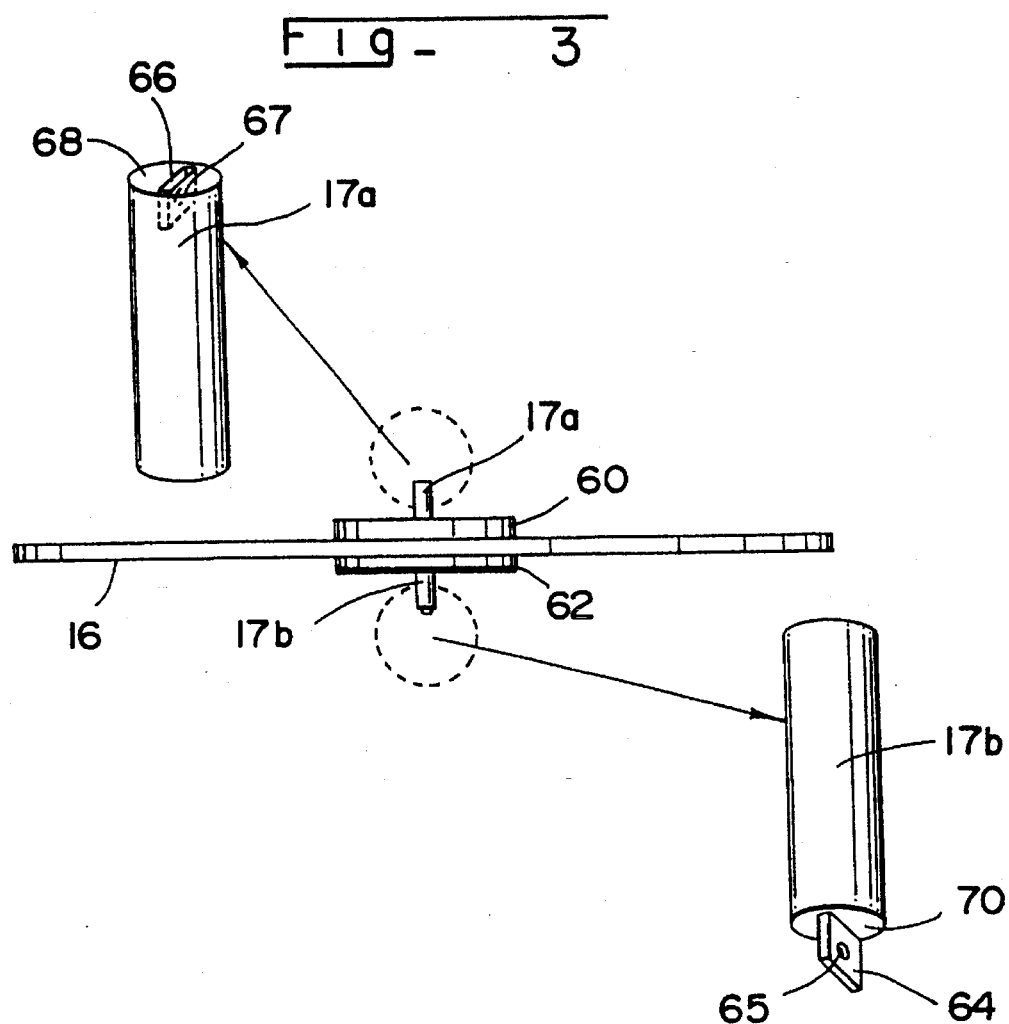

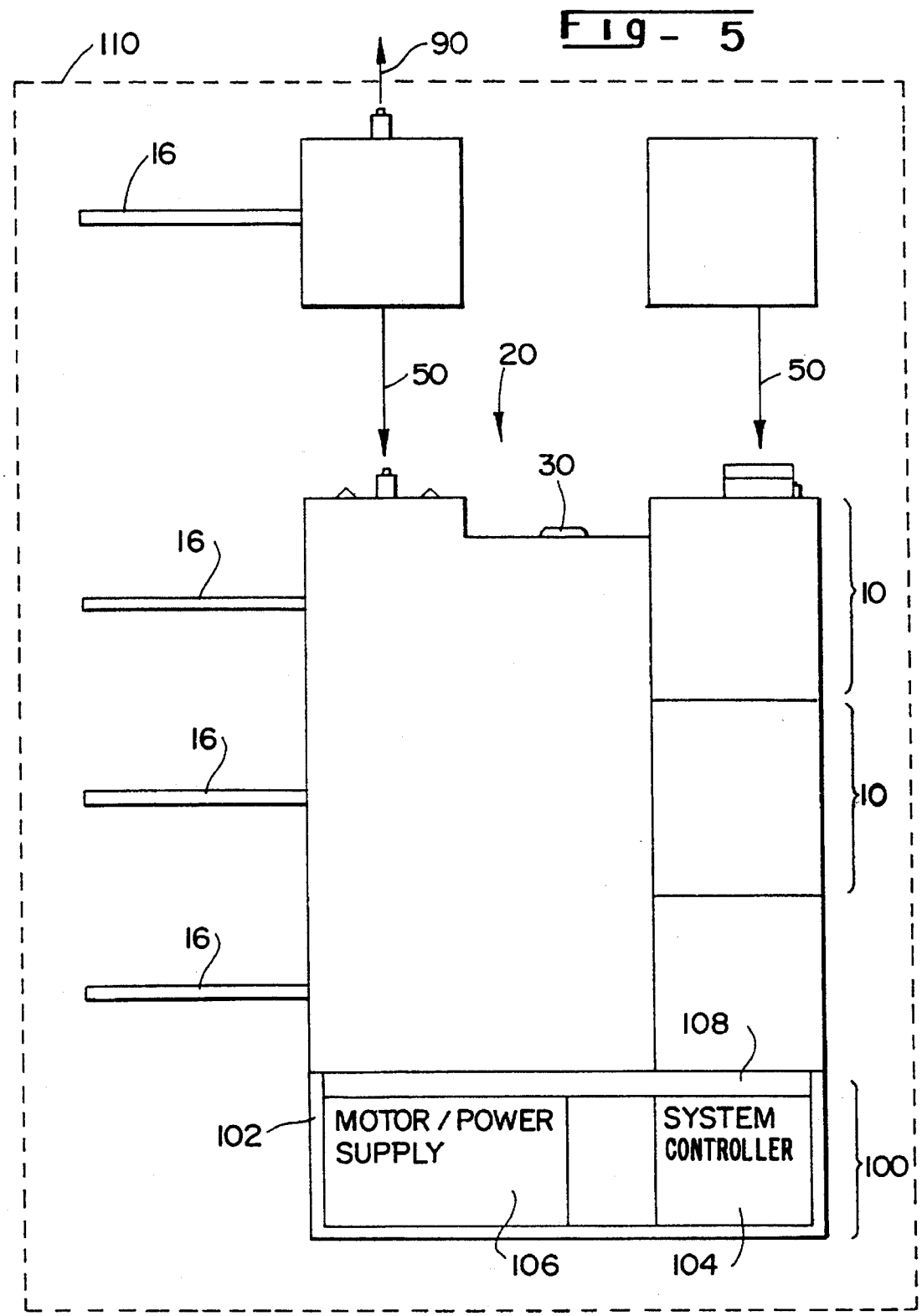

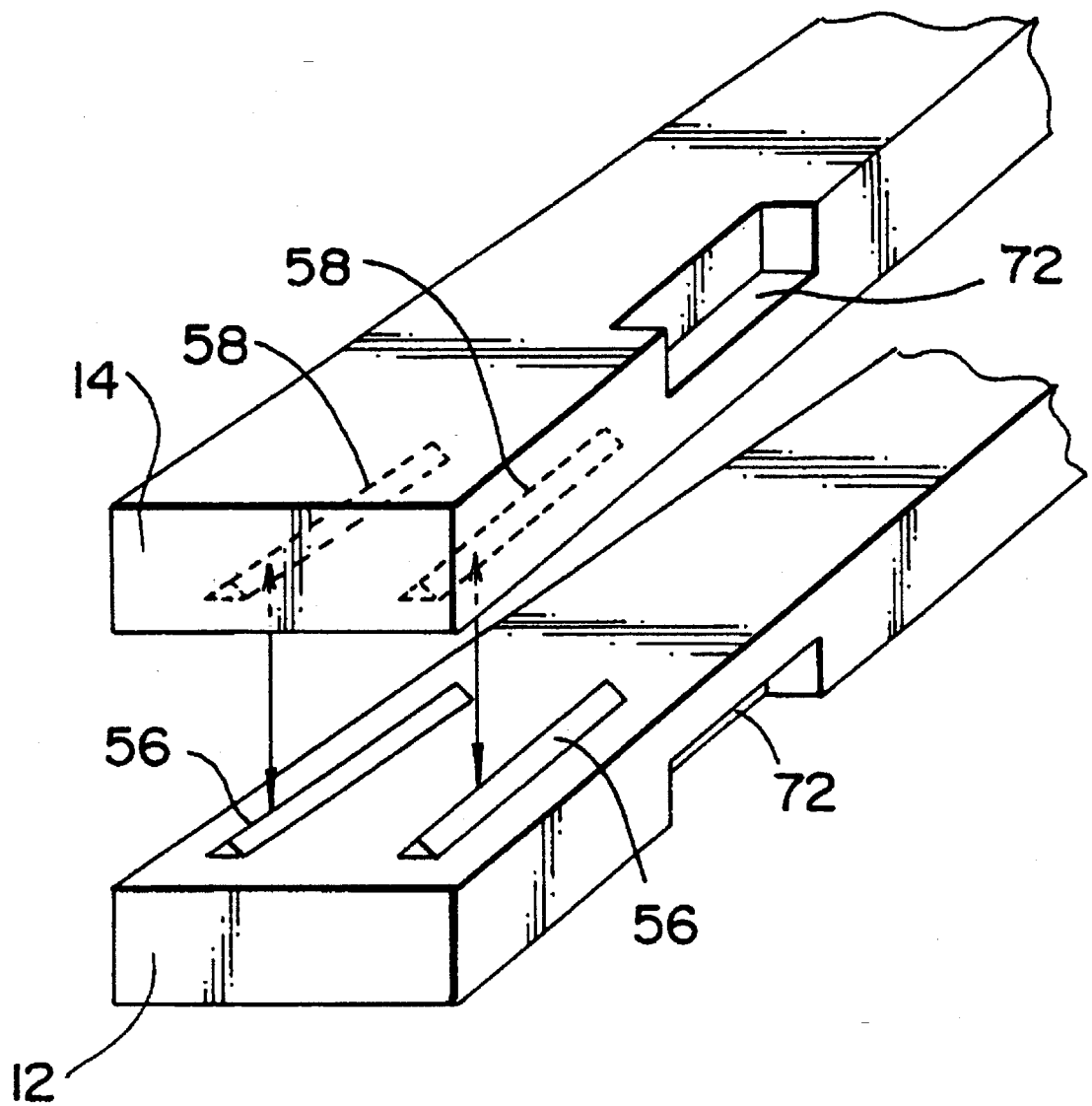
Fig_ 6

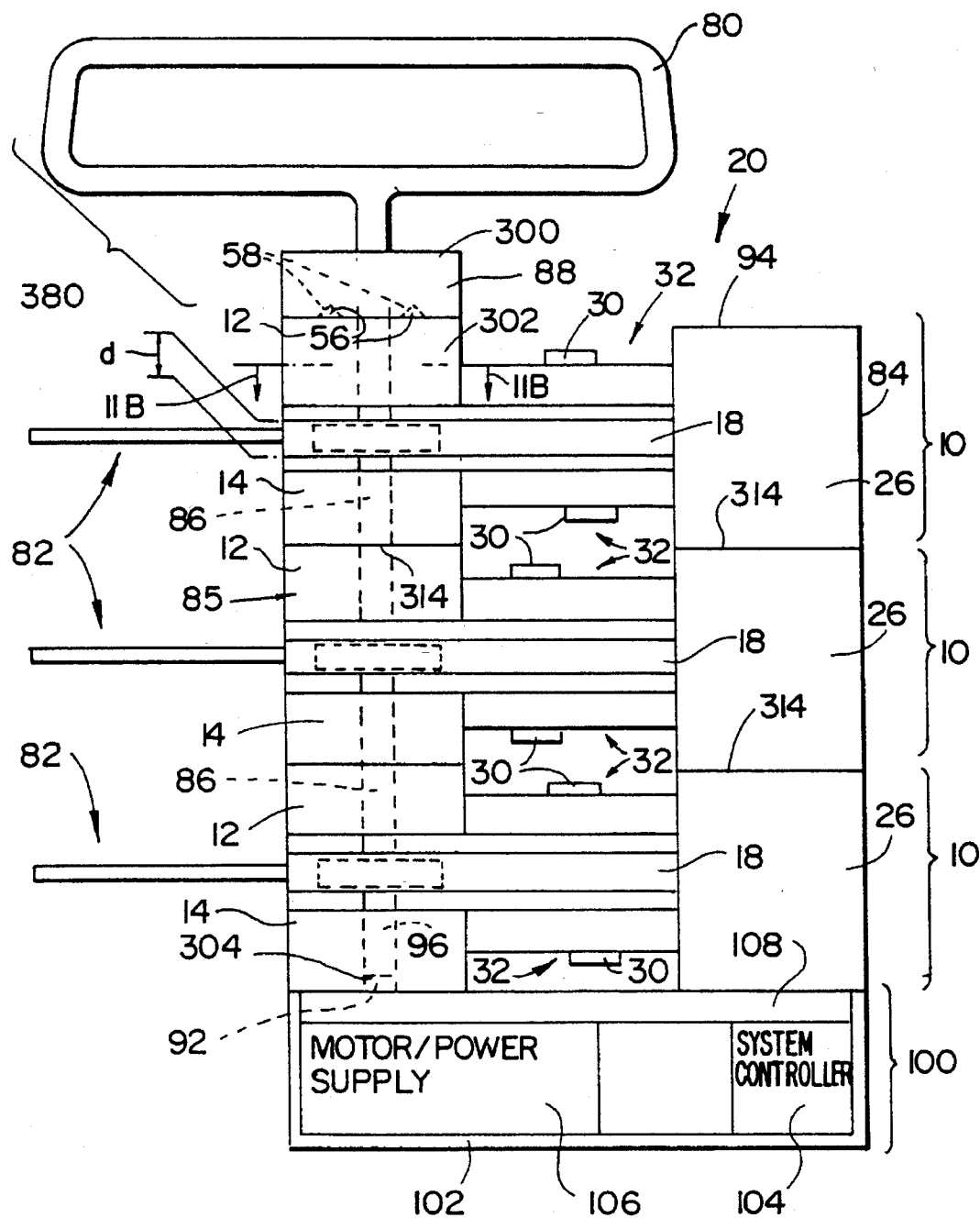

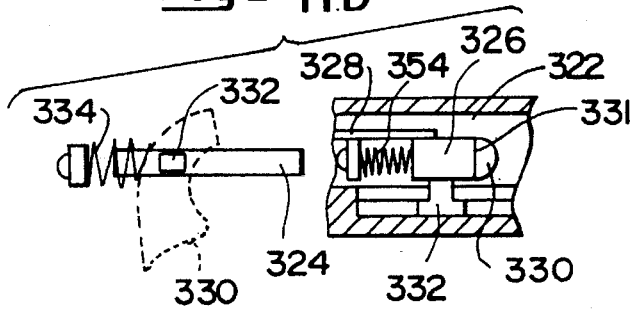
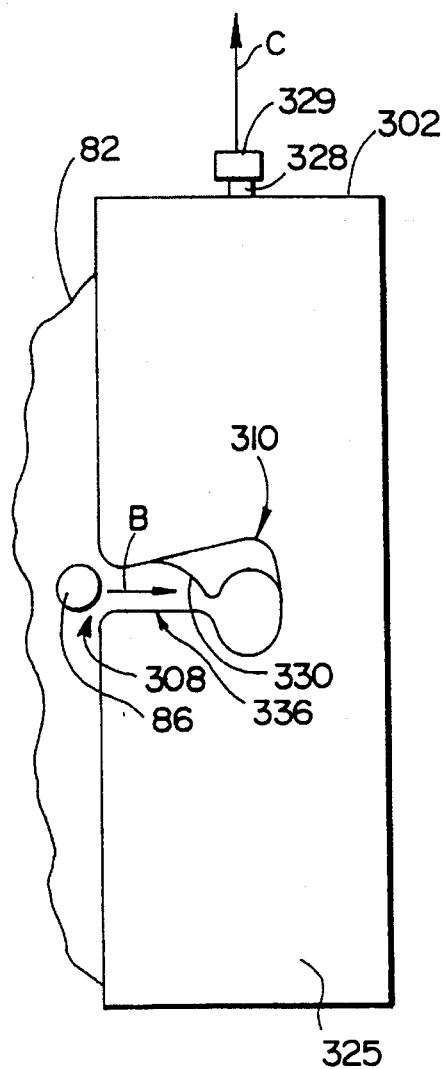
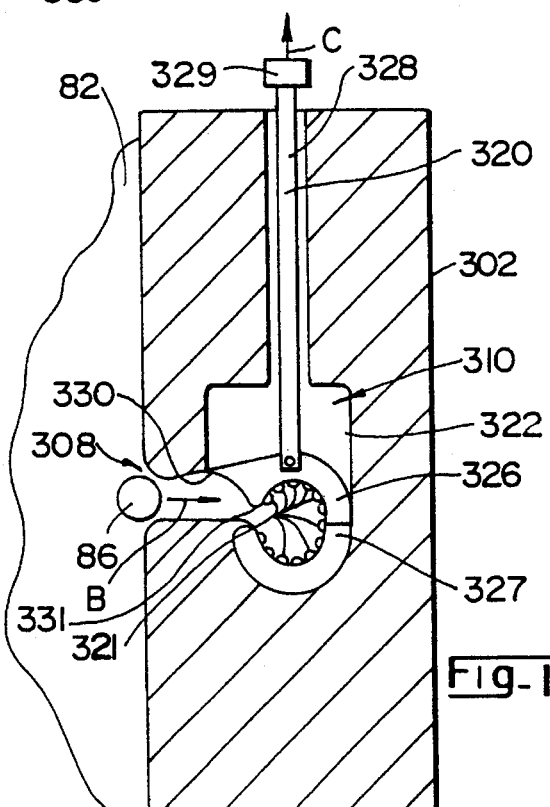
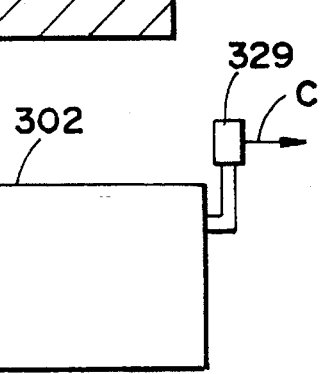

DETACHABLE STORAGE ASSEMBLY

BACKGROUND OF THE INVENTION

1. Field of the Invention

The present invention generally relates to an apparatus for storing data. More particularly, the present invention is directed to one or more storage units and a detachable assembly thereof. Each storage unit has a storage medium support structure which is configured to movably support at least one storage medium carrying member.

2. Discussion of Background Information

It has been recognized that rewritable optical disks are subject to less stringent environmental restrictions than magnetic disks. This is because in order to achieve greater densities in magnetic disk storage devices, read/write heads generally need to be positioned extremely close to the media surface of the magnetic disk or platter. As a practical matter, the read/write head may be placed so close to the surface of the platter that it is spaced from the surface only by the rush of air between the arm holding the head and the media surface. The tolerances for the distance between the head and the media surface are extremely stringent—so stringent that the presence of dust particles or other contaminants can significantly affect the operation of the read/write head. Thus, an entire magnetic disk storage device, including all platters and read/write units, must be enclosed in a "clean", i.e., completely sealed, environment which cannot be opened without introducing damaging and sometimes fatal contaminating materials, such as dust particles, to the recording media on the platters. As a result, if there is a failure in the recording media and/or in the read/write units of a magnetic disk storage device, repair requires the complete replacement of both the recording media (i.e., all of the platters) and the read/write units.

One of the most common problems occurring with magnetic disk storage devices involves a phenomenon known as a "head crash." During a head crash, a read/write unit of a magnetic disk contacts the recording media of an associated platter. Such contact typically may result in permanent damage to the platter surface, may result in loss of data, and may even render the platter unusable. Because the complete device, including all platters and their associated read/write units, is sealed, the complete device must be removed and replaced as a single entity. Such a replacement may take a significant amount of time, such as, several hours.

In addition, once the storage device is replaced, the original contents, which are usually stored in archival storage devices, must be reloaded into the new magnetic disk storage device, and any subsequent updates after the archival dates must be recreated. Depending on the size of the storage device being reloaded, this reloading process can take a substantial amount of time.

Optical disk storage devices do not have many of the disadvantages associated with magnetic storage devices, such as the "head crash" noted above. Platters in an optical disk storage device typically are located relatively far away from their associated laser read/write heads, as compared to the magnetic disk storage device. For example, a read/write head may be positioned about 3 mm away from the surface media of a platter. Thus, dirt, dust, and other small particles will not likely affect the reliability of the optical storage device. Moreover, since the read/write head is not close to the surface media, head crashes rarely occur. Failures in optical disk storage devices are usually limited to: (1) failure of actuator assemblies or axle motors; and (2) failure of the system controller which supervises actuator and optical head positioning and data transfer to and from disks.

Another problem associated with magnetic disk storage devices (and other magnetic storage devices) is that they take up a significantly larger amount of space, as compared to optical storage devices. Thus, optical storage devices may be used in order to reduce the amount of space needed to store data.

Because of the limitations associated with magnetic storage devices, which have been predominantly used for storing data for digital computer systems, many data storage systems are inflexible and quite costly. For example, since during manufacture, the magnetic storage disk device must be preassembled in a "clean room" free from any stray particles, debris, and dust, standard fixed-size magnetic disk storage devices must normally be purchased. Thus, if a storage device is purchased which is larger than needed, excess space is wasted and an unnecessary expenditure is incurred. On the other hand, if a relatively small magnetic storage device is purchased, and in a short time a larger magnetic storage device is required, two or more magnetic storage devices must be combined (which may have a negative effect on the speed of the system, or require additional hardware to interact with the magnetic storage devices), or a larger magnetic storage device must be purchased.

It is thus desirable to provide a storage device which occupies a relatively small amount of space, has a high storage capacity, can be easily reconfigured to allow storage of more or less data depending on the present needs of the system to which the storage device is connected, and may be easily repaired without replacing the entire storage device.

U.S. Pat. No. 4,888,751 (YOSHIMARU et al.) discloses an image information processing apparatus which may accommodate a number of optical disks, and which is capable of supporting up to five optical disks. The apparatus disclosed by YOSHIMARU et al., however, has a fixed outer dimension. That is, the overall frame structure of the storage device has a fixed size, and if less than five disks are loaded, spacers or collars must be used to occupy the extras space not being used. Thus, when one is using less than five disks, the same overall storage space (dictated by the dimensions of the outer frame structure of the storage device), is still occupied. When one wants to expand the potential storage capacity of the overall unit, there is a fixed maximum number of disks (e.g., 5) which may be accommodated. Additionally, since each of the elements of the apparatus disclosed by YOSHIMARU et al. are relatively permanently secured to each other, it is difficult to disassemble the apparatus of YOSHIMARU et al., thus inhibiting repair of, and access to, elements of the apparatus.

SUMMARY OF THE INVENTION

In view of the above, the present invention, through one or more of its various aspects or embodiments, is thus presented to bring about one of more of the following objects and advantages.

It is an object of the present invention to provide an optical storage device which can provide high speed data transfers from optical storage medium carrying members, such as rewritable and write once read many optical disks. It is a further object of the present invention to provide such a system with an extremely low probability of data loss, and with very short repair time.

It is yet a further object of the present invention to provide an optical storage device having an easily openable/non-sealed casing, thus allowing easy access to the storage device for quick repair and reassembly.

It is yet a further or alternative object of the present invention to provide an optical storage device which may be easily disassembled and reassembled thus allowing for easy repair and/or replacement of parts.

It is yet a further object of the present invention to provide an apparatus which will allow any number of separate interconnectable disk units to be assembled simply by "plugging together" or stacking respective disk units, thus enabling one to custom-make a storage device of any desired size.

It is yet an additional object of the present invention to provide an optical storage device which will not be sensitive to exposure to the atmosphere, and will be less susceptible to loss of data.

It is yet a further object of the present invention to reduce the need for archival reload or recovery as a by-product of repairing the storage device, and to reduce the repair time of such a storage device. It is also a further object to reduce the occurrence of, and need for, repair of the storage device to situations which rarely occur, such as failure of a an actuator assembly or a disk-spin motor.

The present invention, therefore, is directed to an apparatus for storing data which comprises a storage medium support frame for supporting storage medium carrying members of substantially similar configuration. The storage medium support frame has a mechanism for adjusting the size of the support frame to accommodate an arbitrary number of storage medium carrying members. The apparatus may be provided with at least one storage medium carrying member, which may comprise a platter, or an optical storage disk in the form of a platter, such as a rewritable or a write once read many optical disk.

In one particular aspect of the present invention, a storage medium support frame is provided with a plurality of disk units coupled to each other, each disk unit comprising a disk support structure for supporting at least one platter.

In accordance with another aspect of the invention, each platter has an axle which extends from both surfaces of the platter. Each axle has two ends, each end having a connector for interconnecting with an end of an adjacent axle. Thus, a plurality of the platters may be interconnected to form one common axle located at a common axis of the storage medium support frame.

In one particular aspect of the present invention, each of the disk units is provided with a mechanism for detachably connecting, and thereby stacking, an arbitrary number of disk units together to form the storage medium support frame. The connecting mechanism may be formed on a stacking block located at one end of the disk support structure of the disk unit. In this regard, the connecting mechanism may comprise a mechanical snap-connector placed on upper and lower portions of the stacking block.

In accordance with yet another aspect of the present invention, each stacking block houses at least one actuator which controls movement of at one least read/write head.

In accordance with another aspect of the present invention, the disk support structure comprises guide and support means for guiding and providing lateral and vertical support to at least one platter that is supported by the disk unit. The apparatus may further comprise a spine for providing a common support for the disk units, wherein the guide and support mechanism includes: (1) a horizontally extending bracing member connected, at a first end, to the spine; and (2) a member rigidly coupled to a second end of the bracing member for rotatably supporting at least one of the platters of the apparatus.

The spine may be formed by means of a plurality of stacking blocks interconnected with other, each of the blocks having, e.g., mechanical snap connectors on upper and lower portions thereof. Each stacking block may be provided with at least one actuator for controlling movement of at least one read/write head to traverse the media surface of a platter.

In accordance with another aspect of the present invention, the horizontally extending brace member comprises a semi-circular member, and the rotatable supporting mechanism comprises at least one member which extends across a horizontal surface of the semi-circular member and which has a vertically extending hole therethrough. Each platter may be provided with an axle which extends from both surfaces of the platter, wherein the ends of the axles may be interconnected with each other to form one common axle located at a common axis of the storage medium support frame. In this regard, the vertically extending hole of the member is adapted to receive the common axle formed by the plurality of axles of the platters.

In accordance with yet another aspect of the present invention, the at least one member comprises an upper stabilizing member extending across a top surface of the semi-circular member and a lower stabilizing member extending across a bottom surface of the semi-circular member. Both the upper and lower stabilizing members are provided with concentric, vertically extending holes located at mid-points thereof, and each upper stabilizing member of a respective disk unit is adapted to physically mate with a lower stabilizing member of an adjacent disk unit which is detachably connected to the respective disk unit.

In accordance with yet another aspect of the present invention, the apparatus is further provided with an outer casing which allows ready access to the storage medium support frame, and which encases the disk units assembled in the form of the storage medium support frame.

In accordance with yet another aspect of the present invention, the storage medium support frame also comprises a base unit for receiving at least one disk unit and for physically supporting the complete storage medium support frame. The base unit includes a base unit frame which supports a power supply for supplying power to each of the disk units, a system controller for controlling movement of the read/write head corresponding to each of the disk units, and a motor for rotating the platters of the disk units.

In an alternative embodiment, the present invention is directed to a storage unit for supporting at least one storage medium carrying member having at least one storage surface. The storage unit is provided with a storage medium support structure which has a mechanism for movably supporting at least one storage medium carrying member and a connecting mechanism for detachably connecting the support structure to another support structure of generally similar configuration. In accordance with a particular aspect of the invention, each of these storage medium carrying members may comprise a platter, or an optical storage disk in the form of a platter.

The storage medium support structure may be provided with a guide and support mechanism for guiding and providing lateral and vertical support to at least one platter that is supported by the storage unit. The guide and support mechanism may be provided with a horizontally extending bracing member having, at one end, a connector adapted to detachably mate with another support structure. The connector, when mated with the other support structure, forms part of a vertically extending spine. The guide and support mechanism may be also be provided with an upper stabilizing member and a lower stabilizing member coupled to the bracing member at an end opposite to the one end of the bracing member. The upper and lower stabilizing members provide lateral support, and act as a sleeve, for an axle of a platter which is supported in the respective disk unit.

In accordance with another aspect of the invention, the connecting mechanism comprises a stackable housing located at an end of the storage medium support structure. The stackable housing may include at least one actuator for controlling movement of the read/write head. The housing may also be provided with at least one mechanical connector on an upper portion and a lower portion thereof.

In accordance with another particular aspect of the invention, the stackable housing includes both male and female electrical connectors, which may, for example, comprises multi-pin port connectors.

In accordance with another particular aspect of the invention, the connecting mechanism comprises axle sections, which may be connected to the at least one storage medium carrying member.

In a further embodiment of the invention, a multi-platter assembly is adapted to be mounted on the frame. A motor is mounted to the frame and coupled to the common axle for driving the multi-platter assembly. A data transfer structure is also provided for interacting with the platters so as to transfer data to and from the platters. The multi-platter assembly may optionally have a handle attached or coupled to a top portion of the multi-platter assembly.

In a particular aspect of the invention, the data transfer structure is provided with a head positioning assembly which is positioned near surfaces of the platters and which has moving elements adapted to move along a path which extends radially from the common axis of the multi-platter assembly. Read/write heads are mounted to the moving elements of the head positioning assembly.

In yet another aspect of the invention, a stabilizing support structure is coupled to a top portion of the multi-platter assembly and is rigidly secured to the frame, and thereby provides lateral support to the multi-platter assembly.

In accordance with another aspect of the invention, a mechanism is provided for detachably connecting a bottom portion of the multi-platter assembly to the frame. The mechanism may be embodied in a snap connector provided on a bottom end of the common axle.

The above-listed objects and advantages, and other objects, features, and advantages of the present invention will be more fully set forth hereinafter.

In the present description, the terms "platter" and "disk" are utilized. The term "disk" is sometimes used in the field to refer to a complete storage device, which may be composed of a plurality of individual platters, and thus may not represent a single "disk" but a plurality of "disks". In this context, "platter" is typically used to denote a single platter or disk, whereas "disk" is used to denote the complete storage device, regardless of whether or not the storage device contains one or a plurality of platters. For purposes of this disclosure, "disk" and "platter" will both refer to a disk or platter in the singular. Should the term "disk" be referring to a complete storage device, regardless of the number of platters in the storage device, such will be explicitly stated.

BRIEF DESCRIPTION OF THE DRAWINGS

The above and other objects, features and advantages of the present invention are further disclosed and described in the detailed description which follows, by reference to the attached drawings, which comprise non-limiting examples of preferred embodiments of the present invention, in which like reference numerals represent similar parts throughout the several views of the drawings, and wherein:

FIG. 3 illustrates, in a side view, a platter to be used in conjunction with the assembly of the present invention, wherein enlarged views are provided for the axle of the platter;

FIG. 4 illustrates, in a cross-sectional side view, the disk unit of FIG. 1B, taken along the line 4—4;

FIG. 5 illustrates a particular embodiment of a storage assembly unit in accordance with the present invention;

FIG. 6 illustrates, in a perspective view, the mating relationship between an upper and lower stabilizing member of respective disk units as the disk units are about to be connected with each other;

FIG. 8 illustrates a second embodiment of the storage assembly of the present invention;

FIGS. 11A–11D illustrate a disengagable bearing mechanism in accordance with the second embodiment of the storage assembly;

DETAILED DESCRIPTION OF THE PREFERRED EMBODIMENTS

Figure 1A:
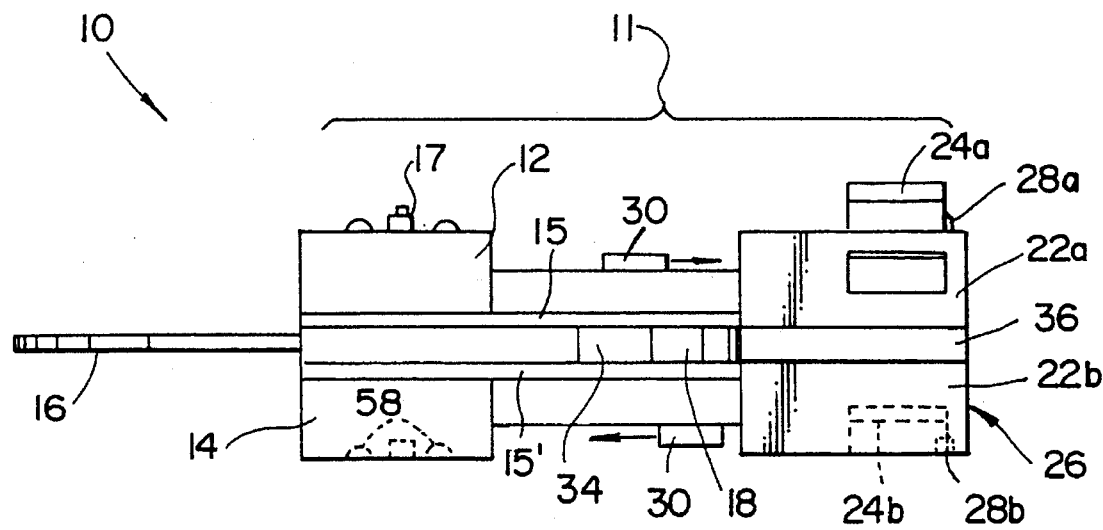
FIGS. 1A and 1B illustrate, in side and top views, respectively, a disk unit of a particular embodiment of the present invention.
Figure 1B:
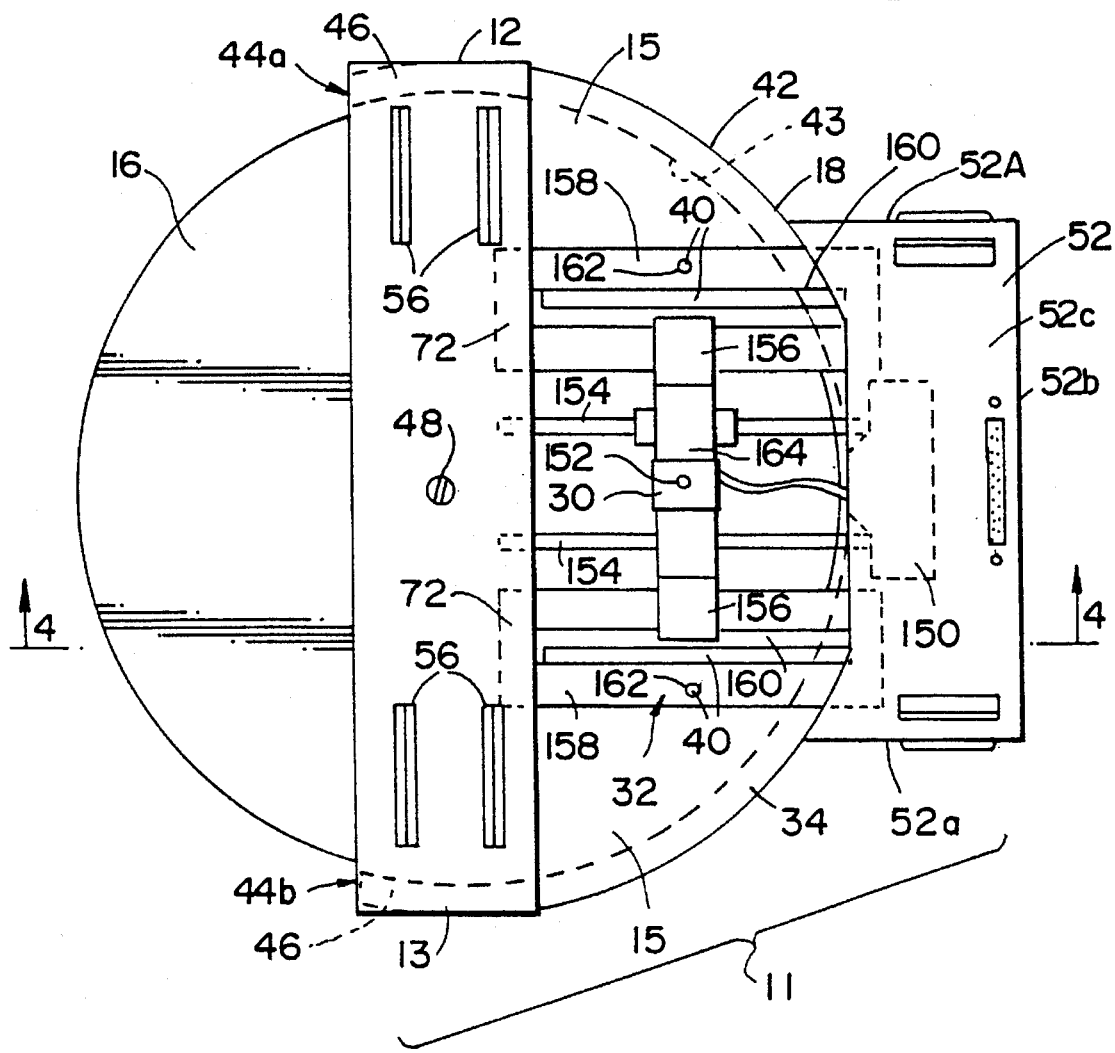

With particular reference to the drawings, in greater detail, FIGS. 1A and 1B show a side and top view, respectively, of a single disk unit in accordance with a particular embodiment of the stackable assembly of the present invention. In this embodiment, platter 16 is rotatably supported by a disk support structure 11 which includes a horizontally extending bracing member 18, upper and lower casings 22a, 22b, and upper and lower stabilizing bushings 12, 14.

Figure 2A:
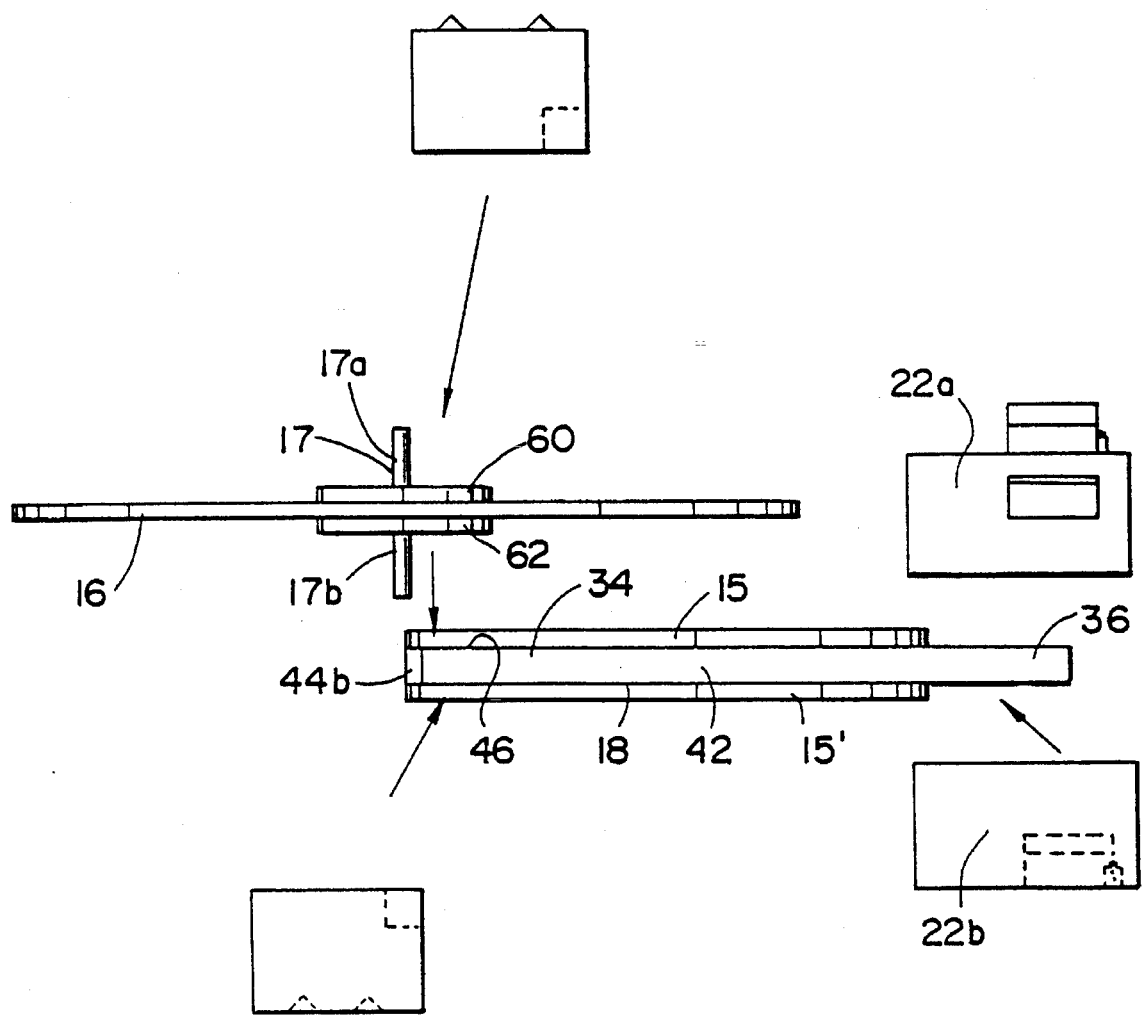
FIGS. 2A–2B illustrate, in side and top views, portions of a disk unit in disassembled form.

FIGS. 2–4 illustrate additional features of the disk unit. As illustrated in FIG. 2A, horizontally extending bracing member 18 comprises a semi-circular member 34 and a stacking block coupling member 36 rigidly secured to, and preferably integrally formed with, the outer mid-portion of semi-circular member 34.

Semi-circular member 34 provides both lateral and vertical support to upper and lower stabilizing bushings 12, 14 which rotatably receive and support a platter 16. Stacking block coupling member 36 couples upper casing 22a with lower casing 22b, and thus is sandwiched between upper casing 22a and lower casing 22b. The combined upper casing 22a, stacking block coupling member 36, and lower casing 22b, constitute a single outer stacking block 26.

Upper stabilizing bushing 12 is securely mounted to a top surface of semi-circular member 34, and lower stabilizing bushing 14 is securely mounted to a bottom surface of semi-circular member 34 in a position parallel to and symmetrical with respect to upper stabilizing bushing 12. Upper stabilizing bushing 12 and lower stabilizing bushing 14 are each connected to semi-circular member 34 so as to extend across the full diameter of semi-circular member 34, with ends of each of the upper and lower stabilizing bushings 12, 14 being aligned in a substantially flush relation with an outer circumferential surface 42 of semi-circular member 34.

Semi-circular member 34 comprises an outer circumferential surface 42, an inner circumferential surface 43, a first end 44a, and a second end 44b. Upper and lower stabilizing bushings 12, 14 are mounted so as to extend horizontally across the diameter of semi-circular member 34. Upper stabilizing member 12 is connected at its first end to the upper surface 46 (see FIG. 2A) of the semi-circular member 34 at a position adjacent the first end 44a of the semi-circular member, and is connected at its second end to upper surface 46 at a position adjacent to the second end 44b of semi-circular member 34. Lower stabilizing bushing 14 is securely fastened to semi-circular member 34 in a similar fashion, and extends from the lower surface of semi-circular member 34, at a position adjacent first end 44a, to another portion of the lower surface of the semi-circular member, at a position adjacent to second end 44b.

Each of the upper and lower stabilizing bushings 12, 14 is provided with a vertically extending cylindrical hole 48 located at their respective mid-sections. The holes are positioned to form a common axis of disk unit 10 and also of platter 16. Hole 48 is adapted to receive, in a snug, yet freely movable fashion, axle 17 of platter 16. Roller bearing rings 13 (see FIG. 4) may be provided within each hole to guide the free rotational movement of axle 17.

In accordance with this particular embodiment, each of the upper and lower casings 22a, 22b houses a laser 150. In addition, upper and lower casings 22a, 22b support, in part, cores 158, and guide rails 154 of an actuator and a carriage assembly 32. Two sets of cores 158 and two sets of guide rails 154 extend between casings 22a, 22b and respective upper and lower stabilizing bushings 12, 14. Actuator and carriage assembly 32 includes a voice coil positioning system, having cores 158, and voice coils 156 positioned thereon. A read/write head 30 is provided on a head support member 164 which extends between thee two voice coils 156. Voice coils 156 are driven to cause the read/write head 30 to traverse the radial direction of platter 16.

Each of guide rails 154 are embedded at their respective ends in one of bushings 12, 14, and a respective one of casings 22a, 22b, and are positioned so that they extend parallel to a line which extends radially from the center of hole 48 (and radially from the center of each platter 16). Laser 150 is positioned within each of casings 22a, 22b to direct light to read/write head 30 of each respective actuator and carriage assembly 32.

Figure 2B:
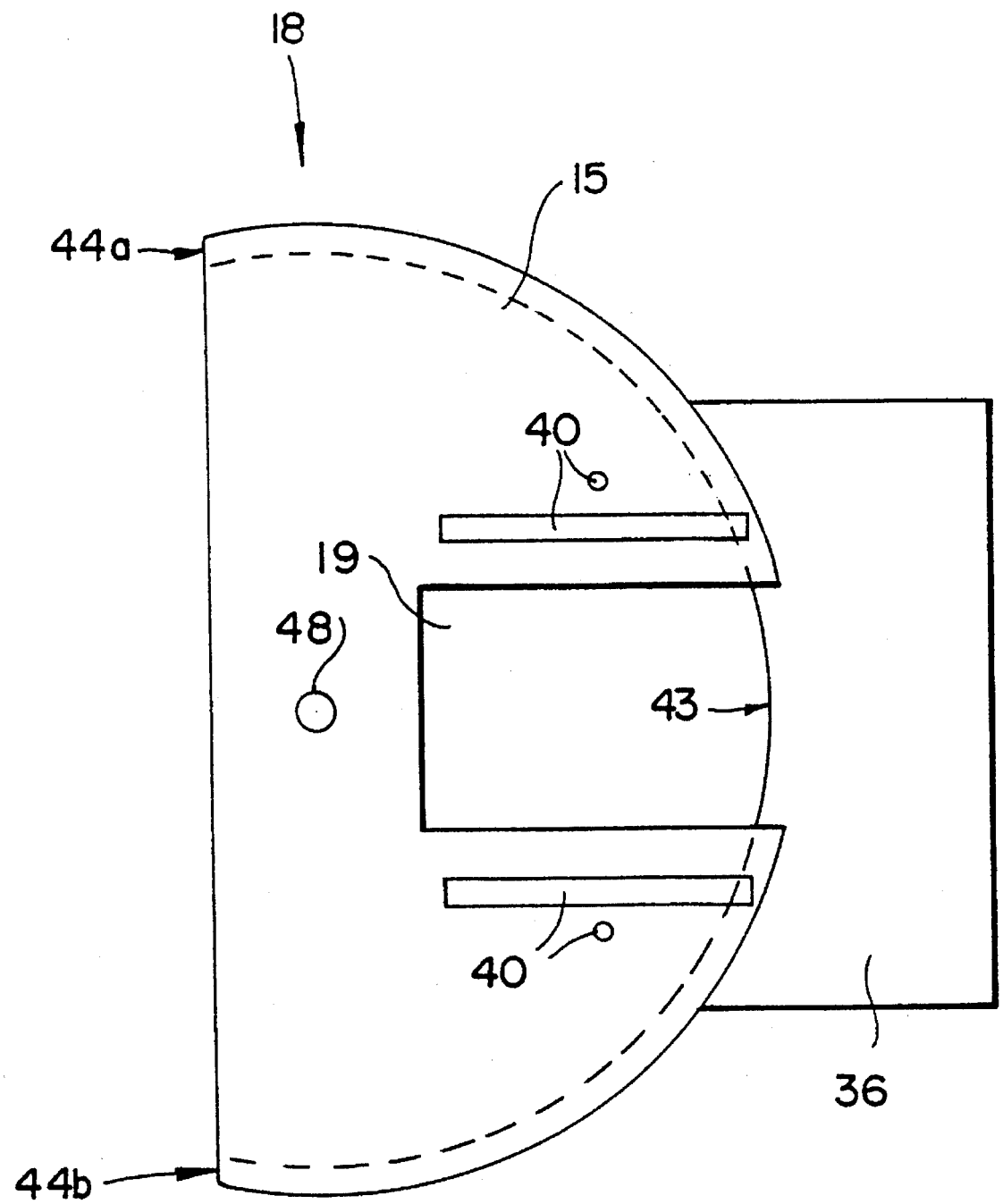

Each of cores 158, due to their additional weight, are supported on one of an upper plate member 15 and a lower plate member 15', which are each provided with core connecting members 40 (see FIG. 2B). Core connecting members 40 are dimensioned and configured to mate with central opening 160 and bore 162 of each core 158.

It should be noted that each core 158 is embedded into a side portion of a respective bushing 12, 14. Accordingly, each bushing is provided with a block-shaped recess 72, as can be seen in FIG. 6.

Figure 7:
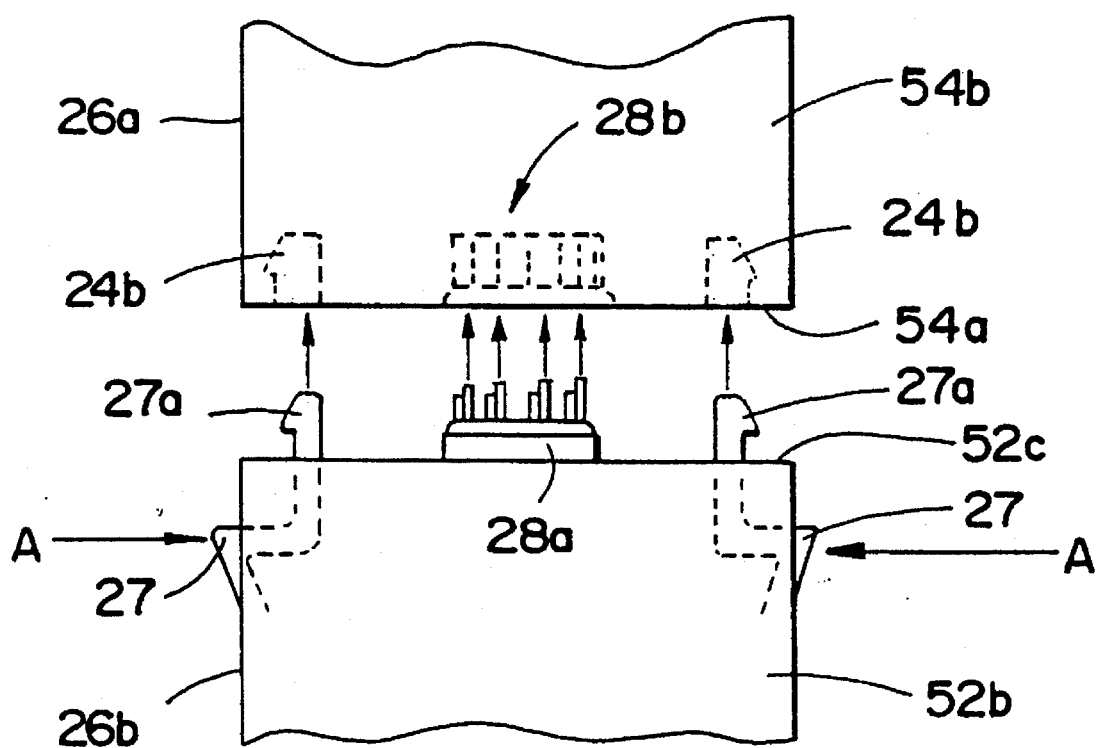
FIG. 7 illustrates two respective stacking blocks being interconnected with each other by means of a mechanical connector and an electrical connector.

Referring to FIGS. 1A–1B and 7, each of the upper and lower casings 22a, 22b are also provided with mechanical connectors 24a, 24b and electrical connectors 28a, 28b. Two male mechanical connector mechanisms 24a are provided on an upper surface 52c of upper casing 22a at respective locations adjacent to each of two respective side surfaces 52a located on casing 22a. Similarly, two female mechanical connectors 24b, in the form of accommodating recesses, are provided at corresponding locations in a lower surface 54a of lower casing 22b. The female and male connectors 24a, 24b are adapted to provide a snap-fit connection between respective stacking blocks 26 of respective disk units 10 (see FIG. 7). Although specific mechanical connectors are disclosed, any suitable mechanical connector could be used to releasably connect adjacent disk units.

In the particular embodiment of the mechanical connector depicted in FIG. 7, resilient release members 27 are integrally attached to each of male mechanical connectors 24a to allow disconnection of respective stacking blocks 26. By depressing both release members 27 in the direction of arrows A, male mechanical connectors 24a are caused to disengage female mechanical connectors 24b. In other words, depression of the bases of these resilient members moves heads 27a to disengage notches in female connectors 24b.

FIG. 5 illustrates a complete stackable head assembly in accordance with a first embodiment of the present invention. A storage medium support frame 20 rotatably supports a plurality of storage medium carrying members in the form of platters 16. Storage medium support frame 20 is formed by detachably connecting, and thereby stacking, a desired plurality of disk units 10 together.

The storage medium support frame 20 is physically supported by base unit 100, which includes a base unit frame 102. Base unit frame 102 houses a power supply 106, a system controller 104 for sending signals to each respective actuator of the various disk units 10, and a motor 106 for transmitting rotational movement to a common axle and thus rotating all of the platters of the disk units 10 in unison. System controller 104 controls movement of read/write heads 30, and transfers data, to be written to or read from platters 16, to and from an external bus (not shown) connected to the stackable disk assembly.

As shown by arrows 50 in FIG. 5, each disk unit 10 may be snapped or detachably connected, and thus "stacked" onto a corresponding disk unit 10. Referring to FIG. 7, as an upper disk unit 10 is snapped onto to a lower disk unit 10 in this fashion, male outer connectors 24a are received by female connectors 24b. Simultaneously, male electrical connector 28a is received by female electrical connector 28b. Thus, once a stacking block 26a is "stacked" on top of another stacking block 26b, the respective disk units are securely, but detachably fastened. Also, all pertinent electrical connections are made by conventional snap-fit electrical connectors 28a, 28b, each having a plurality of contacts, which are needed to provide power to the respective actuator and to provide communication paths (for sending and receiving control and data signals) to system controller 104.

In addition, referring to FIG. 6, as one disk unit 10 is snap-fit onto an adjacent disk unit 10, as shown by arrows 50 in FIG. 5, a lower stabilizing bushing 14 of the top disk unit is mated with an upper stabilizing bushing 12 of the lower disk unit. A plurality of tapered, generally pyramidal ribs 50 are provided, which extend along the longitudinal direction on an upper surface of upper bushing 12. A plurality of tapered, generally complementary-shaped recesses 58 are provided, which extend along a lower surface of lower bushing 14. As an upper disk unit 10 is attached to another lower disk unit 10, protrusions 56 are physically engaged and/or coupled with respective recesses 58.

Tapered protrusions 56 are snugly fitted within tapered recesses 58, and thus align upper bushing 12 with lower bushing 14 of the adjacent disk unit. Accordingly the storage medium support frame is made more stable; and lateral movement of individual disk units, with respect to the overall storage medium support frame 20, is prevented.

FIG. 3 illustrates an individual platter 16 which is to be supported by storage medium support frame 20 of the preferred embodiment of the present invention. Upper spacer 60 and lower spacer 62 are provided on the upper and lower surfaces of platter 16, respectively. Additionally, an upper axle portion 17a and lower axle portion 17b are formed to provide an axle 17 for platter 16. These axles extend transversely with respect to the upper and lower surfaces of platter 16, and are each located at the center axis of platter 16.

An upper end 68 of axle 17 is provided with a mechanism for interconnecting with a lower end of another, adjacently positioned and aligned axle 17. In this particular embodiment, the upper end 68 of axle 17 comprises a groove 66 which is interconnectable with a tongue 64 located on a lower end 70 of another axle 17. Tongue 64 is provided with a spring-biased ball resting in a recess provided in one side of tongue 64. A resilient spring member (not shown) is positioned within a recess in tongue 64 which biases ball 65 in a direction extending outwardly from the surface of tongue 64. This spring-biased ball 65 is provided to mate with a semi-spherical recess which is provided along an inner wall of groove 66 located in upper portion 17a of axle 17. Thus, when one disk unit is connected or stacked upon another (FIG. 5), tongue 64 of an upper platter (of an upper disk unit 10) is inserted into a groove 66 of another platter 16, thus forming one common axle located at a common axis 90 (FIG. 5) of storage medium support frame 20.

FIG. 4 shows a cutaway side view of a single disk unit taken along the line 4—4 of FIG. 2B. Referring to FIG. 4, upper stabilizing bushing 12 and lower stabilizing bushing 14 form a specialized fitting which rotatably and securely supports a platter 16. An upper portion 17a and a lower portion 17b of axle 17 respectively extend through holes 48 of their respective stabilizing bushings 12, 14. At the same time, upper spacer 60 and lower spacer 62 of platter 16 are sandwiched between the respective inner surfaces of upper stabilizing bushing 12 and lower stabilizing bushing 14. Stabilizing bushings 12, 14, axle 17, and spacers 60, 62 are preferably formed of a rigid material, such as plastic or any suitable metal alloy, so as to provide low friction, rotational support to platter 16. In this regard, the spacing between bushings 12, 14, the spacers 60, 62, and axle 17, should be set to allow free rotational movement of axle 17, but at the same time, to prevent unwanted, excessive wobble of disk 16 as it is rotated. Roller bearing rings 13 may be provided within hole 48 of each of bushings 12, 14 to form a free rotational movement interface between axle 17 and each of bushings 12, 14.

It is noted that the end portions of each axle 17 may be provided with circumferential grooves to interface with bearing rings 13. Such grooves could serve to maintain intact the vertical, as well as lateral, position of platter 16.

FIGS. 2A and 2B illustrate a disassembled disk unit 10. As noted above, with reference to FIG. 1, disk 16 is placed within an opening on the inner side of semi-circular member 34, and upper stabilizing bushing 12 and lower stabilizing bushing 14 are secured to the ends of semi-circular member 34, so that axle 17 of platter 16 extends through holes 48 in each of upper and lower stabilizing bushings 12, 14. Upper casing 22a is securely fastened to a top surface of stacking block coupling member 36, and lower casing 22b is securely fastened to a lower surface of stacking block coupling member 36, thus forming a complete stacking block 26.

Stabilizing bushings 12, 14 may be secured to semi-circular member 34 by any well-known fastening mechanism or method, such as Welding or by the use of screw and nut fasteners. Similarly, casing 22a, 22b may be permanently fastened or secured to stacking block coupling member 36 in any well-known fashion. Alternatively, any or all of these components may be integrally formed with each other.

FIG. 2B shows a top view of a horizontally extending bracing member 18 of disk support structure 11 of the present invention. Upper plate member 15 and lower plate member 15' (not shown in FIG. 2B; see, e.g., FIG. 2A) are respectively provided on upper and lower surfaces of semi-circular member 34. Each of these plate members 15, 15' have an outer shape which is generally aligned with the outer shape of semi-circular member 34. A hole 48 is provided in a left mid-portion of the plate members, and an opening 19 is provided so that the movable components of actuator and carriage assembly 32 are allowed to move freely when the disk unit is assembled, as shown in FIGS. 1A and 1B. Core connecting members 40 are provided in their appropriate locations to allow connection of cores 158, as shown in FIG. 1B.

Electrical connectors 28a, 28b may comprise any well-known multi-pin serial or parallel port connector which will provide communication paths between each actuator and the system controller 104, which is located in base unit 100 of the stackable assembly.

Referring back to FIG. 5, base unit 100 is preferably provided with a base plate 108, comprising an outer male connector (not shown), which is configured to connect with a female connector 24b of a lowermost disk unit, and one or tapered protrusions (not shown), such as tapered protrusions 56 shown in FIG. 6, to thus physically support and receive the lowermost one of the one or more stacked disk units 10. However, in the alternative, base plate 108 may be provided with unique connectors for permanently attaching a single disk unit thereto; or, a disk unit may be permanently adhered to or fixed to base plate 108 to thus receive other disk units to be stacked thereon. In any case, suitable electrical and mechanical connectors, such as those provided on each disk unit, can be used to mechanically and electrically connect the base unit to the disk unit assembly.

In the previously discussed embodiment, particular connectors 24a, 24b, and 28a, 28b, have been disclosed by way of example, with male connectors being provided on the upper casings 22a, and female connectors being provided on the lower casings 22b. Of course, connectors of different configuration may be provided without departing from the scope of the present invention. For example, the same connectors may be reversed, by putting the male connectors on the lower casings and the female connectors on the upper casings, or by providing a different kind of connector which would provide a secure but detachable connection between disk units. Similarly, although a particular tongue and groove connector is disclosed as shown in FIG. 3 for connecting axle 17 to another axle 17, any other suitable connector which serves the same purpose may be provided, so long as there is sufficient strength and stability in the connection between the respective axles. In this regard, it is also preferable that these connectors be disconnectable to facilitate easy assembly and disassembly of the overall stackable storage assembly.

Figure 9A:
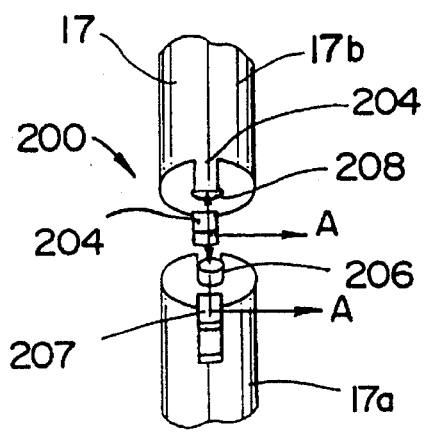
FIGS. 9A–9B and 10 illustrate alternative types of axle connectors of the present invention.
Figure 9B:
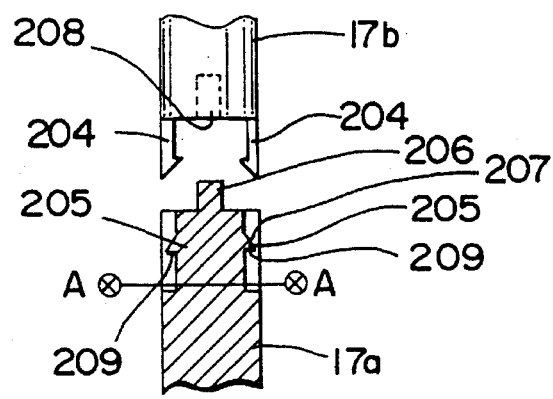
Figure 10:
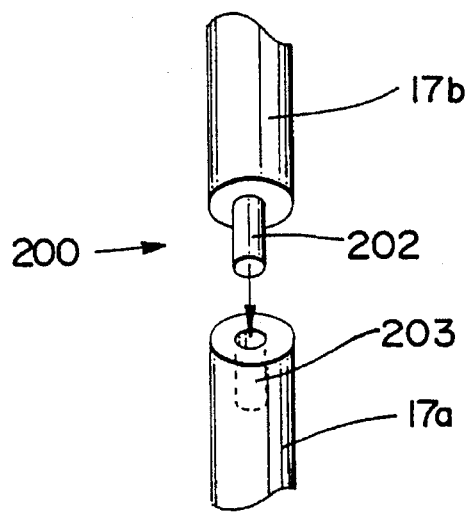

FIGS. 9A, 9B, and 10 illustrate alternative axle connectors 200 which may be used in conjunction with the present invention instead of those illustrated, e.g., in FIG. 3. FIG. 10 depicts a threaded shaft which can be turned-fitted into threaded bore 203. Either left-handed or right-handed threads may be provided, depending on the direction of rotation of the disk assembly during either recording or playback by the stackable assembly. FIGS. 9A and 9B show an alternative embodiment of axle connector 200. Two outer hooks 204 are provided on lower axle portion 17b of one axle, which are adapted to engage recessed lips 205 of an upper axle portion 17a of an adjacent axle. As hooks 204 engage recessed lips 205, concentrically positioned shaft 206 is mated with bore 208. It is noted that outer hooks 204 are preferably made of a resilient material and integrally formed with axle 17. As respective axle portions 17b, 17a are mated with each other, thus causing outer hooks 204 to be displaced in an outward direction by recessed lips 205, outer hooks 204 will absorb the force exerted thereon and bend outwardly, and return to their original position once they reach their connected positions. Recessed lips 205 are each provided with a front tapered portion having a small slope 207 to facilitate a gradual outward displacement of outer hooks 204. A back tapered portion 209, having a larger slope, is provided on the back side of each of recessed lips 205 to facilitate disconnection of the respective axle portions. Since the slope of each of back tapered portions 209 is somewhat larger than the slope of the front tapered portions 207, disconnection of axle connector 200 requires more force.

In accordance with the first embodiment of the present invention, platter 16 comprises an optical storage disk in the form of a platter. Platter 16 may comprise a rewritable optical disk, thus allowing both recording and playing back of information to and from each platter 16 in the stackable assembly. In the alternative, platter 16 may comprise a WORM (write once read many) disk.

As an illustrative, but not limiting, example, platter 16 may comprise a magneto-optical disk such as the PDO 5 ¼" magneto-optical disk which may obtained from Philips and DuPont Optical Company, 1409 Foulk Road, Wilmington, Del. 19803-0469. It is noted that the above-discussed first preferred embodiment only shows one platter for each disk unit; however, each disk unit may alternatively be provided with a plurality of platters. In addition, although each outer stacking block 26 is provided with two casings 22a, 22b (and two actuators), each outer stacking block 26 may be provided with only a single casing, which supports one or more actuators. On the other hand, each disk unit may be provided with any number of (e.g., two or more) platters and/or actuators and carriage assemblies.

With respect to the actuator and carriage assemblies 32 referred to in the above-described embodiment of the present invention, these are generally well-known in the art, and the structure and operation thereof are thus are not discussed in detail herein. It is noted that such actuator and carriage assemblies are commercially available from a number of different sources, including, e.g., Applied Magnetics, Optical Products Division, 18950 Base Camp Road, Monument, Colo. 80132.

Motor 106 may include a 12 V DC constant velocity motor. Power supply 106 will preferably be configured to supply 12 V and 5 V lines to system controller 104, and to each of the actuators via connectors 28a, 28b. In this regard, connectors 28a, 28 b should be electrically coupled in such a fashion as to allow "pass through" connections so that any disk unit can access the necessary power and data lines being routed to system controller 104 via the stacking block connections.

Referring to FIG. 5, an outer casing 110 may be provided, which encases the complete stackable assembly. Outer casing 110 may be provided with, for example, a door, or disassembly mechanism, to allow ready access to the storage medium support frame, for repair, inspection, etc.

A second embodiment of the present invention is illustrated in FIGS. 8, 11A–11D, 12, and 13. A multi-platter assembly 82 is mounted on base unit 100, which may have a configuration similar (or identical) to that of the first embodiment of the present invention. Multi-platter assembly 82 comprises a plurality of platters 16 connected to each other by means of a common axle 86, which is adapted to be removably mounted to storage medium support frame 20. Common axle 86 is adapted to be coupled to drive axle 92 of motor 106, via a snap connector 304, one example of which is presented by connector 200 as shown in FIGS. 9A and 9B.

A top portion of axle 86 is held in position within storage medium support frame 20 by a spring-biased bearing mechanism 310 (see FIGS. 11A, 11B, and 13) for holding common axle 86, so that the center axis of common axle 86 coincides with a common axis of rotation of the complete storage assembly. Spring-biased bearing mechanism 310 rotably supports a top portion of common axle 86, and the bearing mechanism (not shown) of motor/power supply 106 rotably supports a bottom portion of common axle 86.

A handle assembly 380 may optionally be provided, which is rotatably connected to a top portion 88 of axle 86.

Storage medium support frame 20 is configured in a manner substantially similar to the storage medium support frame of the first embodiment shown in FIG. 5 of the present invention. Central column 85, which surrounds axle 86, and a spinal column 84 are provided to support each of a plurality of actuator and carriage assemblies 32.

As shown in FIG. 8, central column 85 comprises bushings 12, 14, and portions of horizontally extending bracing members 18, sandwiched between each pair of bushings 12, 14. Spinal column 84 comprises a plurality of stacking blocks 26. Storage medium support frame 20 may be assembled by means of a plurality of disk units 10, in a similar fashion to the storage medium support frame of the first embodiment of the present invention. In this regard, each of the disk units may be configured so that they may be removably attached to each other; or, in the alternative, they may be permanently fixed by means of welds 314 at the appropriate points of connection of each of the separate disk units 10.

As shown in FIG. 8, a base unit frame 102 is provided, which includes base plate 108, and which houses motor/power supply 106 and system controller 104. Each of these elements performs substantially the same functions as explained with respect to the first embodiment shown in FIG. 5. Base plate 108 may be permanently affixed to each of central column 85 and spinal column 84 of the storage medium support frame 20.

Figure 13:
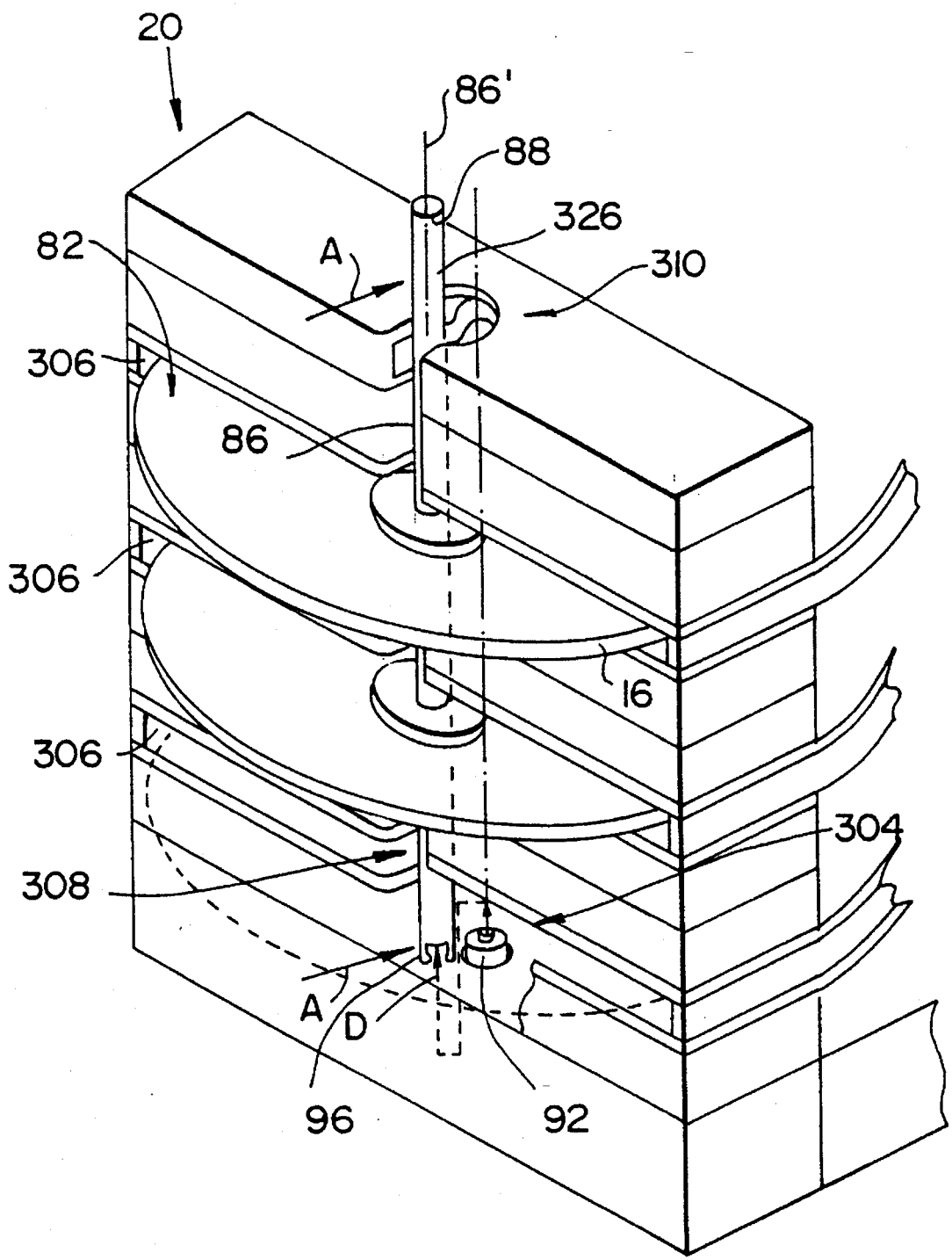
FIG. 13 illustrates, in a perspective view, a multi-platter assembly as it is loaded into the storage medium support frame in the second embodiment.

Referring to FIG. 13, the operation of loading the multi-platter assembly 82 into storage medium support frame 20 will be described. By grasping a top portion of common axle 86 (or rather, if handle 80 is provided, by grasping handle 80), multi-platter assembly 82 can be guided into an interfacing side of storage medium support frame 20, as shown by the arrow A in FIG. 13. As the multi-platter assembly 82 is slid within each of the slots 306, the whole multi-platter assembly 82 is slightly elevated so that bottom portion 96 of axle 86 can clear the uppermost point of drive axle 92. While in this slightly elevated position, each of platters 16 are slid into their respective slots 306, and axle 86 is guided through vertically extending slot 308. This causes an upper portion of axle 86 to engage a movable half bearing 326, and spring-biased bearing mechanism 310 opens and receives axle 86. Once axle 86 is received within bearing mechanism 310, spring-biased bearing mechanism 310 is caused to close (i.e., movable half bearing 326 moves into abutment with axle 86), and the multi-platter assembly is maintained in a position in which the center axis of axle 86 coincides with a common axis of central column 85. When axle 86 is in this position, axle connector mechanism 304 will be in position to be engaged. By pushing the multi-platter assembly 82 in a downward direction, axle connector mechanism 304 will be engaged as indicated by arrows D.

In order to facilitate elevation and subsequent lowering of multi-platter assembly 82, as it is being inserted within corresponding platter slots 306 of central column 85 and pushed downward, causing axle connector mechanism 304 to engage, the spacing d (see FIG. 8) of each of slots 306 must be sufficiently large to accommodate the complete range of vertical movement of the platters.

FIGS. 11A–11D further illustrate spring-biased bearing mechanism 310. FIG. 11A shows a top view of top portion 302, and FIG. 11B shows a cross sectional view of top portion 302 taken along the line 11B–11B. Referring to FIG. 11B, top bushing 302 includes a chamber 322, provided at a central midsection thereof, and an axle slot opening 308. A permanently positioned half bearing 327 is fixed to one side of chamber 322, and a movable half bearing 326 is placed in conjugate relation to half bearing 327, in the other side of chamber 322. Each of half bearings 326, 327, when in a conjugate position with respect to each other, form a central circular opening.

A plurality of vertically extending roller bearings 321 are mounted along the inner semi-cylindrical walls of each of half bearings 326, 327. These vertically extending roller bearings 321 are provided to rotatably support axle 86 of multi-platter assembly 82, when the axle is mounted within central column 85 as shown in FIG. 8.

Movable half bearing 326 is biased, by a compressed spring 334, into its conjugate position with respect to permanently positioned half bearing 327, as shown in its present position indicated FIGS. 11A and 11B. A longitudinally shaped releasing member 328 is provided which extends throughout a passage 320, having a tab 329 attached to an end thereof. As shown in FIG. 11C, when tab 329 is displaced in the direction indicated by arrow C, movable half bearing 326 will disengage.

As shown in FIG. 11D, movable half bearing 326 is mounted on a flanged member 322 which is placed within a slot 324. Slot 324 extends along the direction parallel to passage 320, and provides a path of movement in the direction C (see FIG. 11C) for movable half bearing 326.

Referring to FIGS. 11A and 11B, when multi-platter assembly 82 is guided into a storage medium support frame, as indicated in FIG. 13, axle 86 is caused to engage a cam surface 330 which is provided on movable half bearing 326. Axle 86 engages cam surface 330, and, as it is moved in the direction of arrow B, causes movable half bearing 326 to move away from its conjugate position in the direction of arrow C. Once axle 86 moves beyond the edge 331 of cam surface 330, the compressed force of spring 334 causes movable half bearing 326 to return to its position conjugate to the permanently positioned half bearing 327, as indicated in FIG. 11B. As indicated by the dotted lines, shaft 86 is then supported at all sides by vertically extending roller bearings 321 of half bearings 326, 327, and maintained in a position centered with respect to a longitudinal axis of central column 85 (FIG. 8).

As indicated in FIG. 11A, top 325 and bottom (not shown) portions of top bushing 302 each have a curved passage 336, corresponding to the path of movement of axle 86 as it is guided into central column 85, as indicated in FIG. 13.

As previously described, by moving tab 329 in the direction C, releasing member 18 translates the movement to movable half bearing 326, thereby causing it to disengage from its conjugate position. In order to remove multi-platter assembly 82, tab 329 is displaced in the direction C, causing movable half bearing 326 to disengage. Multi-platter assembly 82 is then elevated, causing it to disconnect from drive axle 92 (see FIG. 3), and multi-platter assembly 82 is pulled in a direction opposite to that indicated by arrow B in FIGS. 11A and 11B.

It is noted that in the embodiment shown in FIGS. 8 and 11–13, only top bushing 302 is provided with a spring-biased bearing mechanism 310. However, depending on the particular implementation of the storage assembly of the present invention, one or a plurality of bushings may be provided with a spring-biased bearing mechanism, for rotatably supporting axle 86 of multi-platter assembly 82. In this regard, in the embodiment shown in FIG. 8, the lowermost bushing 303 may be provided with such a spring-biased bearing mechanism 310, to thus provide increased lateral support to the lower portion of axle 86 of multi-platter assembly 82. Of course, depending on the number of spring-biased bearing mechanisms which are provided, and the ease with which they may be disengaged by use of cam surface 320 and/or releasing member 328, the rated force of compressed springs 334 can be reduced or otherwise altered.

It is noted that each of the components of the stackable assembly depicted in FIG. 8 may be formed in such a fashion so as to be easily disassembled, so as to be able to remove and replace and/or repair defective units and/or parts. For example, common axle 86 may be provided with a plurality of connector mechanisms such as those illustrated in FIG. 3, or FIGS. 9 and 10, of the present application, thus allowing easy assembly and disassembly of respective platters in multi-platter assembly 82.

Common axle 86 may be provided, at a top portion 88, with a connecting mechanism which may be coupled to an additional multi-platter assembly 82, which can be stacked thereon. In this configuration, a connecting mechanism may also be provided on a top portion of spinal column 84, and on a top portion of central column 85, thus allowing an additional storage medium support frame to be stacked on top. This would allow a stackable assembly similar to the stackable assembly depicted in FIG. 5, but in the FIG. 8 embodiment, with each disk subassembly comprising a plurality of platters 16.

Figure 12:
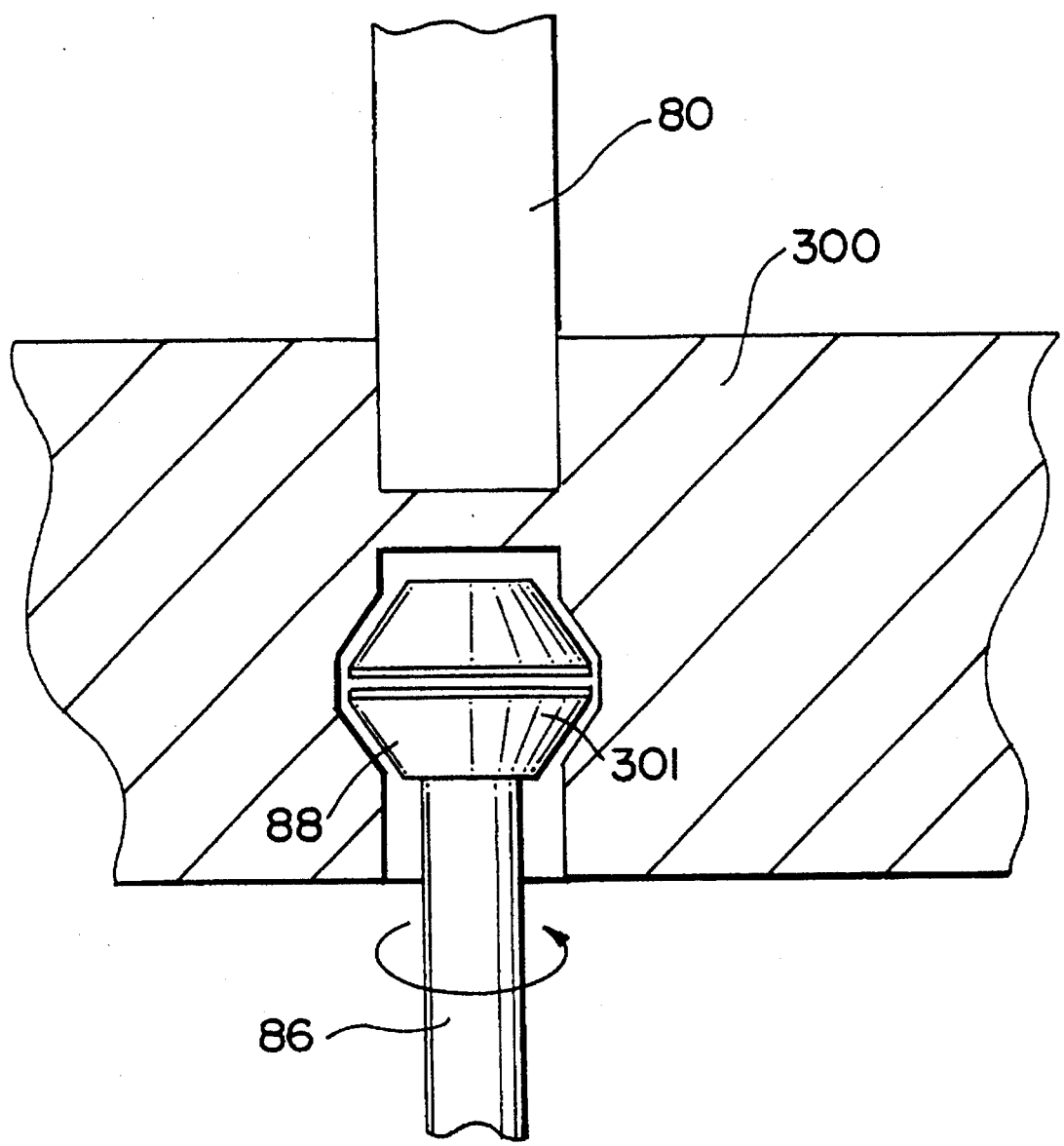
FIG. 12 illustrates, in a cross-sectional side view, a handle and block structure of the second embodiment.

As particularly shown in FIG. 8, a handle assembly 380 may be provided which is coupled to a top portion 88 of common axle 86 of the multi-platter assembly 82. The handle assembly 80 which is shown, comprises a handle 80 and a connect block 300. FIG. 12 illustrates, in more detail, the interface between handle 80, handle connect block 300, and top portion 88 of common axle 86. In accordance with this embodiment, a lower shaft portion of handle 80 is fixed at a central portion of handle connect block 300, and top portion 88 of axle 86, shaped in the form of a ball, is received within a roller bearing assembly 301. Handle connect block 300 is preferably provided with means for detachably connecting to top bushing 302, when multi-platter assembly 82 is in its mounted position as shown in FIG. 8. In this regard, handle connect block 300 may comprise tapered recesses 58, corresponding to tapered protrusions 56 which are provided on a top surface of top portion 302, substantially as shown in FIG. 6 of the present application. When lower portion 96 of common axle 86 is connected to drive axle 92, by means of axle connector mechanism 200, handle connect block 300 is maintained in a mated position with top portion 302, as shown in FIG. 8. This prevents any movement of handle 80 and handle connect block 300 which may, for example, be caused by vibration of axle 86 as it is rotated during operation of the stackable assembly.

Figure 14:
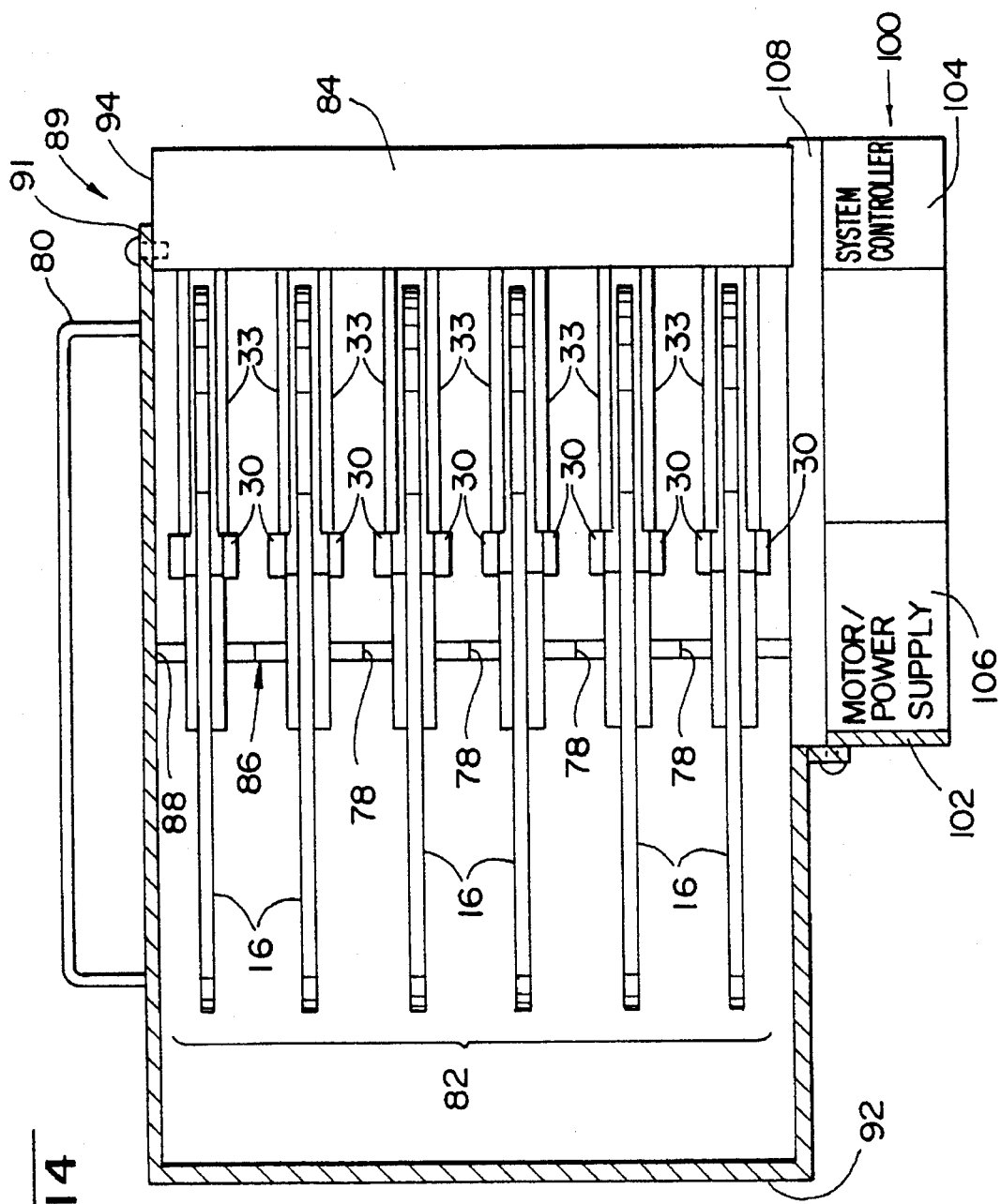
FIG. 14 illustrates a second embodiment of the storage assembly of the present invention.

A third embodiment of the present invention is illustrated in FIG. 14. A multi-platter assembly 82 is mounted on base unit 100, which may have a configuration similar to that of the first and/or second embodiments of the present invention. Multi-platter assembly 82 comprises a plurality of platters 16 connected to each other by means of a common axle 86, which is coupled, via a tongue and groove and/or snap connector, to a drive axle of motor/power supply 106. Spinal column 84 is provided, which houses a servo mechanism (not shown) for controlling each of movable arms 33. A handle 80 may be optionally provided, which is rotatably connected to a top portion 88 of axle 86. Handle 80 facilitates independent removal of the multi-platter assembly, apart from the data transfer structure 89, which comprises spinal column 84, movable arms 33, and head 30. Handle 80 may be integrally provided with a stabilizing support structure 92, for providing stabilizing support to common axle 86 of multi-platter assembly 82. Stabilizing support structure 92 may, for example, comprise a semi-cylindrical, hollow member which is coupled at a top portion 91 to a top portion 94 of spinal column 84, and at a bottom portion to base unit frame 102.

It is noted that only one optical head may be provided for each platter, or, in the alternative, one or more optical heads may be provided for each media surface, thus allowing multiple points of accessing information from the media surfaces of platter 16.

Read/write arms 33 may be adapted to be swingably moved to the side to allow multi-platter assembly 82 to be loaded or unloaded. Each of the components of the stackable assembly depicted in FIG. 14 is preferably formed in such a fashion so as to be easily disassembled, and to facilitate removal, replacement and/or repair of defective units and/or parts. For example, common axle 86 may be provided with a plurality of connector mechanisms such as those illustrated in FIGS. 3, 9, and 10 of the present application, thus allowing easy assembly and disassembly of respective platters in multi-platter assembly 82.

Common axle 86 may be provided at its top portion 88 with a connecting mechanism which may be coupled to an additional multi-platter assembly 82, which can be stacked thereon. In this configuration, a connecting mechanism may also be provided on a top portion of spinal column 84, so that an additional spinal column 84 (and accompanying multi-platter assembly) can be stacked on the top thereof.

Each pair of read/write heads 30 and movable arms 33 may be provided with independent servo motors (not shown) to independently control movement thereof with respect to the platters. However, a single servo (not shown) may be provided, having a single servo motor which controls simultaneous movement of each and every movable arm 33 and read/write head 30, with respect to the individual platters 16. A single rigid column may be provided within a hollow portion of spinal column 84, which is mechanically coupled to each of movable arms 33, and which is driven by a single servo motor. Thus, when the single servo motor (not shown) is driven, all of the movable arms 33 will be driven to move radially as a single unit. The necessary structure for the servo column, the individual servo motor, and the simultaneous control of movable arms 33 may be implemented as known to those skilled in the art. For example, U.S. Pat. No. 3,657,712 discloses a disk storing device having various mechanisms for controlling movement of movable arms carrying read/write heads. The disclosure of U.S. Pat. No. 3,657,712 is expressly incorporated by reference herein in its entirety.

While the invention has been described with reference to preferred embodiments, it is understood that the words which have been used herein are words of description, rather than words of limitation. Changes may be made, within the purview of the appended claims, without departing from the scope and spirit of the invention in its aspects. Although the invention has been described herein in reference to particular means, materials, and embodiments, it is understood that the invention is not limited to the particulars disclosed herein, and that the invention extends to all equivalent structures, methods, and uses such as are within the scope of the appended claims.

What is claimed is:

1. An apparatus for storing data comprising:

a storage medium support frame for supporting storage medium carrying members of similar configuration, said support frame having at least two outer dimensions and including means for changing the size of at least one of said outer dimensions of said support frame to accommodate an arbitrary number of storage medium carrying members; and at least one storage medium carrying member, each of said storage medium carrying members comprising a computer storage disk in the form of a platter, said storage medium support frame comprising a plurality of disk units coupled to each other, each disk unit comprising a disk support structure for supporting at least one platter, wherein said size is changed in accordance with the number of disk units coupled to each other;

each of said disk units comprising means for detachably connecting, and thereby stacking, an arbitrary number of disk units together to form said storage medium support frame;

said disk support structure comprising guide and support means for guiding and providing lateral and vertical support to at least one platter supported by said disk unit;

said apparatus further comprising a spine for providing a common support for said disk units, wherein said guide and support means comprises a horizontally extending bracing member connected at a first end to said spine, and means, rigidly coupled to a second end of said bracing member, for rotatably supporting at least one of said platters.

2. The apparatus according to claim 1, wherein said computer storage disk comprises an optical storage disk.

3. The apparatus according to claim 2, wherein said optical storage disk comprises at least one of a rewritable optical disk and a write once read many optical disk.

4. The apparatus according to claim 1, wherein said detachably connecting means comprises a stacking block located at one end of said disk support structure and comprising mechanical snap connectors on upper and lower portions of said stacking block.

5. The apparatus according to claim 4, wherein each stacking block houses at least one actuator for controlling movement of at least one read/write head.

6. The apparatus according to claim 1, wherein said spine comprises a plurality of stacking blocks, each of said stacking blocks having an upper portion, a lower portion, and mechanical snap connectors on said upper and lower portions, and further wherein each stacking block comprises at least one actuator for controlling movement of at least one read/write head to traverse the media surface of a platter.

7. The apparatus according to claim 1, wherein said horizontally extending bracing member comprises a semi-circular member, and said rotatably supporting means comprises at least one member extending across a horizontal surface of said semi-circular member and having a vertically extending hole.

8. The apparatus according to claim 7, wherein each platter comprises an axle extending from both upper and lower surfaces of the platter, and wherein each of a plurality of axles comprises two ends, each end having means for interconnecting with an end of another axle, a plurality of said platters thereby being interconnectable to form one common axle located at a common axis of said storage medium support frame;

said vertically extending hole being adapted to receive said common axle.

9. The apparatus according to claim 7, wherein said at least one member comprises an upper stabilizing member extending across a top surface of said semi-circular member and a lower stabilizing member extending across a bottom surface of said semi-circular member, both said upper and lower stabilizing members having concentric vertically extending holes located at midsections thereof, each upper stabilizing member of a respective disk unit being adapted to engage a lower stabilizing member of an adjacent disk unit which is detachably connected to said respective disk unit.

10. The apparatus according to claim 1, further comprising an outer casing for encasing said disk units assembled in the form of said storage medium support frame, said casing comprising means for allowing ready access to said storage medium support frame.

11. The apparatus according to claim 1, wherein said storage medium support frame further comprises a base unit for receiving at least one disk unit and supporting said storage medium support frame, said base unit comprising a base unit frame which supports a power supply for supplying power to each of said disk units, a system controller for controlling movement of read/write heads corresponding to each of said disk units, and a motor for rotating the platters of said disk units.

12. The apparatus according to claim 1, wherein said changing means comprises means for changing the outer dimension of the support frame in a direction parallel to an axis of rotation of the computer storage disks.

13. An assembly of storage units for supporting plural storage medium carrying members each having at least one storage surface, said storage units comprising respective storage medium support structures, each said support structure having means for movably supporting at least one storage medium carrying member, each said support structure further comprising connecting means for detachably connecting said support structure to another adjacent support structure, each said storage medium carrying member comprising a computer storage disk, said means for detachably connecting comprising axle sections;

said means for detachably connecting further comprising at least one recess and at least one projection, each said projection and each said recess having a complementary configuration, wherein respective projections and recesses on adjacent support structures mate with each other when at least two of said support structures are connected to each other.

14. The assembly according to claim 13, wherein each of said storage medium carrying members comprises a platter.

15. The assembly according to claim 14, wherein each of the storage medium carrying members comprises an optical storage disk.

16. The assembly according to claim 15, each said storage medium support structure comprising guide and support means for guiding and providing lateral and vertical support to at least one platter supported by said storage unit.

17. The assembly according to claim 13, said means for detachably connecting further comprising a stackable housing located at an end of each said storage medium support structure.

18. The assembly according to claim 17, said storage unit further comprising at least one carriage/rail assembly and read/write head, said stackable housing including at least one actuator for controlling movement of said read/write head.

19. The assembly according to claim 17, said stackable housing including at least one mechanical connector on each of an upper portion of said housing and on a lower portion of said housing.

20. The assembly according to claim 17, said stackable housing including both male and female electrical connectors.

21. The assembly according to claim 20, said electrical connectors comprising multi-pin port connectors.

22. The assembly according to claim 13, wherein said axle sections are connected to said at least one storage medium carrying member.

23. The storage unit according to claim 13, wherein said at least one projection comprises a plurality of protrusions formed on an upper surface of said support structure.

24. The storage unit according to claim 13, wherein said at least one projection comprises a plurality of tapered protrusions formed on an upper surface of said support structure.

25. The storage unit according to claim 13, wherein said at least one projection comprises a plurality of levers and said at least one recess comprises a lever receiving surface.

26. The storage unit according to claim 25, wherein said levers comprise resilient release members.

27. A storage unit for supporting at least one storage medium carrying member having at least one storage surface, said storage unit comprising a storage medium support structure having means for movably supporting at least one storage medium carrying member; said support structure further comprising connecting means for detachably connecting said support structure to another support structure of similar configuration, each of the storage medium carrying members comprises an optical storage disk in the form of a platter;

said storage medium support structure further comprising guide and support means for guiding and providing lateral and vertical support to at least one platter supported by said storage unit, said guide and support means comprising a horizontally extending bracing member, having, at one end, connecting means adapted to detachably mate with said another support structure, said connecting means, when mated with said another support structure, forming part of a vertically extending spine.

28. The storage unit according to claim 27, wherein said guide and support means further comprises an upper stabilizing member and a lower stabilizing member coupled to said bracing member at an end opposite to said one end, said upper and lower stabilizing members providing lateral support for, and acting as a sleeve for, an axle of the at least one platter.

29. An apparatus for storing computer data comprising:

a multi-platter assembly having a plurality of platters, said multi-platter assembly having a common axle which comprises at least one detachable connecting mechanism for connecting to another axle or axle section;

a frame, said multi-platter assembly being adapted to be removably mounted on said frame;

said frame comprising a support that extends along a plane that transverses said common axle, said support having a periphery and an opening spaced from said periphery for receiving and supporting said common axle, said support further comprising means for guiding and providing lateral and vertical support for at least one platter supported by said multi-platter assembly, said apparatus further comprising a spine for providing a support for said multi-platter assembly, wherein said guide and support means comprises a horizontally extending bracing member connected at a first end to said spine, and means, rigidly connected to a second end of said bracing member for rotatably supporting at least one of said platters; and means for resiliently retaining said common axle in said opening, said support further comprising a slot that extends from said periphery to said opening, wherein said common axle is adapted to be removably mounted within said support by moving said common axle along said slot and into said opening.

30. An apparatus according to claim 29, further comprising:

a motor mounted to said frame and coupled to said common axle for driving said multi-platter assembly; and a data transfer structure for interacting with said platters so as to transfer data to and from said platters.

31. An apparatus according to claim 30, wherein said data transfer structure comprises:

a head positioning assembly positioned near surfaces of said platters and adapted to move along paths which extend radially from said common axle; and a read/write head mounted to a moving element of said head positioning assembly.

32. An apparatus according to claim 30, further comprising a stabilizing support structure coupled to a top portion of said multi-platter assembly and rigidly secured to said frame, thereby providing lateral support to said multi-platter assembly.

33. An apparatus according to claim 30, further comprising means for detachably connecting a bottom portion of said multi-platter assembly to said frame.

34. An apparatus according to claim 33, wherein said means for detachably connecting comprises a snap connector provided on a bottom end of said common axle.

35. An apparatus according to claim 29, wherein said apparatus further comprises a handle coupled to a top portion of said multi-platter assembly.

36. The apparatus according to claim 29, wherein said resilient retaining mechanism comprises a spring-biased bearing mechanism.

37. The apparatus according to claim 29, wherein said another axle or axle section comprises an axle of a motor.

38. The apparatus according to claim 29, wherein said another axle or axle section comprises an axle of another platter.

39. The apparatus according to claim 38, wherein each of said plurality of platters comprises a detachable connecting mechanism, said plurality of platters being connected with each other to form said common axle.

40. The apparatus according to claim 29, wherein said at least one detachable connecting mechanism comprises a tongue and groove connector.

41. The apparatus according to claim 29, wherein said at least one detachable connecting mechanism comprises a resilient snap connector.

42. The apparatus according to claim 29, wherein said at least one detachable connecting mechanism comprises a threaded member.

43. The apparatus according to claim 29, wherein said means for resiliently retaining comprises bias means for applying a continuous resilient force in a lateral direction toward a side of said common axle, and means for coupling the force applied by said bias means with said common axle.

* * * * *

UNITED STATES PATENT AND TRADEMARK OFFICE
CERTIFICATE OF CORRECTION

PATENT NO. : 5,477,518

DATED : December 19, 1995

INVENTOR(S) : D. HIATT

Page 1 of 3

It is certified that error appears in the above-indentified patent and that said Letters Patent is hereby corrected as shown below:

On the title page: section [56], "References Cited", "U.S. PATENT DOCUMENTS", insert the following documents:

---3,657,712 4/1972 Dirks
   4,131,921 12/1978 Gruczelak 360/86
   4,387,452 6/1983 Bricot et al. 369/32
   4,495,533 1/1985 Chambers 360/72.2
   4,566,087 1/1986 Kraft 369/34
   4,644,515 2/1987 Allebest et al. 369/32
   4,754,447 6/1988 Vansant 369/270
   4,862,584 9/1989 Budy et al. 369/36
   4,888,751 12/1989 Yoshimaru et al. 369/36
   4,972,396 11/1990 Rafner 369/32
   4,989,191 1/1991 Kuo 369/33---.

section [56], "References Cited", "FOREIGN PATENT DOCUMENTS", insert ---0033052 8/1981 E.P.O.---.

section [56], "References Cited", "OTHER PUBLICATIONS", insert the following documents:

UNITED STATES PATENT AND TRADEMARK OFFICE
CERTIFICATE OF CORRECTION

PATENT NO. : 5,477,518

DATED : December 19, 1995

INVENTOR(S) : D. HIATT

It is certified that error appears in the above-indentified patent and that said Letters Patent is hereby corrected as shown below:

---English Abstract of European Application No. 0,033,052.

IBM Technical Disclosure Bulletin, "Data Processing System", R.R. Bowdle, Vol. 3, No. 5, October 1960.

Magneto-Optical Disk Brochure (Philips and Dupont Optical), (H-04192/PDO-0043).

Applied Magnetic Optical Products Division, Product Information Brochure (Actuator and Carriage Assemblies).

UNITED STATES PATENT AND TRADEMARK OFFICE
CERTIFICATE OF CORRECTION

PATENT NO. : 5,477,518
DATED     : December 19, 1995
INVENTOR(S) : D. Hiatt

It is certified that error appears in the above-indentified patent and that said Letters Patent is hereby corrected as shown below:

Applied Magnetic Optical Products Division, Product Information Brochure (5 1/4" Magneto-Optical Assembly).

H. SUKEDA et al., "High-speed/High-Density Magnetic-Optic Recording", Systems, MB 10:20 a.m.-noon, Ballroom A4/5, David K. Campbell, Presider-Hewlett-Packard Co., Feb. 10, 1992.

A copy of Diagram for an adaptor to link ECKD/byte multiplexer channel to MicroChannel.---.

Signed and Sealed this

Fourth Day of February, 1997

Attest:

BRUCE LEHMAN

Attesting Officer

Commissioner of Patents and Trademarks